(12) United States Patent
Tong et al.

(10) Patent No.: US 11,721,297 B2
(45) Date of Patent: Aug. 8, 2023

(54) DISPLAY METHOD, DISPLAY DEVICE, AND STORAGE MEDIUM

(71) Applicants: BEIJING BOE DISPLAY TECHNOLOGY CO., LTD., Beijing (CN); BOE TECHNOLOGY GROUP CO., LTD., Beijing (CN)

(72) Inventors: Guangyun Tong, Beijing (CN); Zhuolong Li, Beijing (CN); Yu Zhang, Beijing (CN); Bochang Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 64 days.

(21) Appl. No.: 17/434,023

(22) PCT Filed: Nov. 12, 2020

(86) PCT No.: PCT/CN2020/128457
§ 371 (c)(1),
(2) Date: Aug. 26, 2021

(87) PCT Pub. No.: WO2022/099554
PCT Pub. Date: May 19, 2022

(65) Prior Publication Data
US 2022/0351695 A1    Nov. 3, 2022

(51) Int. Cl.
*G09G 3/36* (2006.01)
*G02F 1/1347* (2006.01)

(52) U.S. Cl.
CPC ......... *G09G 3/3607* (2013.01); *G02F 1/1347* (2013.01); *G02F 2202/28* (2013.01);
(Continued)

(58) Field of Classification Search
CPC ........... G02F 1/133601; G02F 1/13471; G02F 1/1347; G09G 3/3607; G09G 2300/023;
(Continued)

(56) References Cited

U.S. PATENT DOCUMENTS 10,678,057 B2     6/2020  Lu et al.
2012/0086740 A1   4/2012  Murai et al.
(Continued)

FOREIGN PATENT DOCUMENTS

CN     101546541 A     9/2009
CN     107450203 A     12/2017
(Continued)

*Primary Examiner* — Xuemei Zheng
(74) *Attorney, Agent, or Firm* — Lippes Mathias LLP

(57) ABSTRACT

Provided is a display method applicable to a display device, the display device including a liquid crystal light control panel and a liquid crystal display (LCD) panel stacked together, the method including: acquiring a first sub-image and a second sub-image of an image to be displayed on the LCD panel, a boundary of the first sub-image being in contact with a boundary of the second sub-image; and decreasing a grayscale value of a first region, which is in contact with a boundary of a second light control region, in a first light control region, in response to determining that a grayscale value of the second sub-image is greater than a grayscale threshold.

20 Claims, 8 Drawing Sheets

(52) U.S. Cl.
CPC ............... *G09G 2300/023* (2013.01); *G09G 2320/0257* (2013.01)

(58) Field of Classification Search
CPC ... G09G 2320/0233; G09G 2320/0686; G09G 2320/028
See application file for complete search history.

(56) References Cited

U.S. PATENT DOCUMENTS

| | | | |
|---|---|---|---|
| 2012/0092385 A1* | 4/2012 | Ikeno | G09G 3/3611 345/88 |
| 2016/0170702 A1 | 6/2016 | Jiang et al. | |
| 2017/0032556 A1 | 2/2017 | Kamiyoshihara | |
| 2017/0343839 A1* | 11/2017 | Nam | G02F 1/13471 |
| 2018/0233095 A1 | 8/2018 | Furumoto | |
| 2018/0335630 A1 | 11/2018 | Lu et al. | |

FOREIGN PATENT DOCUMENTS

| | | | |
|---|---|---|---|
| CN | 109828417 A | | 5/2019 |
| CN | 110673412 A | | 1/2020 |
| CN | 110945415 A | | 3/2020 |
| CN | 111258135 A | * | 6/2020 |
| CN | 111489716 A | | 8/2020 |

\* cited by examiner

DISPLAY METHOD, DISPLAY DEVICE, AND STORAGE MEDIUM

CROSS-REFERENCE TO RELATED APPLICATIONS

This application is a 371 of PCT Application No. PCT/CN2020/128457, filed on Nov. 12, 2020, the disclosure of which is herein incorporated by reference in its entirety.

TECHNICAL FIELD

The present disclosure relates to the field of display technologies, and in particular, relates to a display method, a display device and a storage medium.

BACKGROUND

Liquid crystal displays (LCDs) have been widely applied to electronic products such as tablets, TVs, mobile phones, and onboard displays because of their advantages such as high image quality, small volume, light weight, low driving voltage, low power consumption, no radiation, and relatively low manufacturing cost.

An LCD may be manufactured by using a dual-layer liquid crystal panel (BD cell) to improve a contrast of the LCD. A structure of the dual-layer liquid crystal panel includes a liquid crystal light control panel and an LCD panel stacked together. The LCD panel may include a first array substrate and a color filter substrate, the first array substrate being disposed to face the color filter substrate. The LCD panel is configured to display an image. The liquid crystal light control panel may include a second array substrate and a cover panel, the second array substrate being disposed to face the cover panel. The liquid crystal light control panel is configured to adjust luminance of respective regions based on an image to be displayed on the LCD panel.

SUMMARY

Embodiments of the present disclosure provide a display method, a display device and a storage medium.

In one aspect, a display method applied to a display device is provided. The display device includes a liquid crystal light control panel and an LCD panel stacked together. The method includes:

acquiring a first sub-image and a second sub-image of an image to be displayed on the LCD panel, a boundary of the first sub-image being in contact with a boundary of the second sub-image, a grayscale value of the first sub-image being greater than a grayscale value of the second sub-image;

determining whether the grayscale value of the second sub-image is greater than a grayscale threshold;

in response to determining that the grayscale value of the second sub-image is greater than the grayscale threshold, adjusting a grayscale value of a first region, which is in contact with a boundary of a second light control region, in a first light control region, such that an adjusted grayscale value of the first region is less than a grayscale value of the first region before adjustment, wherein the first light control region is a region of the liquid crystal light control panel corresponding to the first sub-image, and the second light control region is a region of the liquid crystal light control panel corresponding to the second sub-image;

in response to determining that the grayscale value of the second sub-image is not greater than the grayscale threshold, adjusting a grayscale value of a second region, which is in contact with a boundary of the first light control region, in the second light control region, such that an adjusted grayscale value of the second region is greater than a grayscale value of the second region before adjustment; and controlling the LCD panel to display the image to be displayed, and controlling the liquid crystal light control panel to display a light control image, wherein a grayscale of the light control image is adjusted.

Optionally, adjusting the grayscale value of the first region in the first light control region includes: adjusting the grayscale value of the first region based on a grayscale value of a first fixed region in the first light control region other than the first region and a grayscale value of the second light control region, such that the adjusted grayscale value of the first region is less than the grayscale value of the first fixed region and greater than the grayscale value of the second light control region.

Optionally, the first region includes at least two consecutive first sub-dimming regions; the first sub-dimming region includes at least one first pixel arranged along the boundary of the second light control region; and in response to adjusting the grayscale value of the first region, grayscale values of the at least two first sub-dimming regions are sequentially decreased along a direction from the first fixed region to the second light control region.

Optionally, adjusting the grayscale value of the second region in the second light control region includes: adjusting the grayscale value of the second region based on a grayscale value of a second fixed region in the second light control region other than the second region and a grayscale value of the first light control region, such that the adjusted grayscale value of the second region is greater than the grayscale value of the second fixed region and less than the grayscale value of the first light control region.

Optionally, the second region includes at least two consecutive second sub-dimming regions; the second sub-dimming region includes at least one first pixel arranged along the boundary of the first light control region; and in response to adjusting the grayscale value of the second region, grayscale values of the at least two second sub-dimming regions are sequentially increased along a direction from the second fixed region to the first light control region.

Optionally, the display device further includes a scattering film, an optical adhesive film, a first polarizer and a second polarizer, wherein the scattering film and the optical adhesive film are disposed between the liquid crystal light control panel and the LCD panel, and the first polarizer and the second polarizer are disposed on two sides of the LCD panel respectively; a maximum number of the first sub-dimming regions in the first region and a maximum number of the second sub-dimming regions in the second region are determined based on a width of the first pixel of the liquid crystal light control panel and thicknesses and refractive indexes of the first polarizer, the LCD panel, the second polarizer, the scattering film and the optical adhesive film.

Optionally, the thickness of the optical adhesive film is greater than a thickness threshold, wherein the thickness threshold is determined based on a center-to-center distance of two adjacent sub-pixels of the LCD panel.

Optionally, the first sub-image is a rectangular image; the second sub-image is a rectangular ring-shaped image intersecting with an outer boundary of the first sub-image; and a shape of the first light control region is a rectangle; in the case that a number of first pixels, in the first light control region, arranged in a direction of a short side of the rectangle is greater than or equal to 9, the first region includes four consecutive first sub-dimming regions; and in the case that the grayscale value of the first region is adjusted, grayscale values of the four first sub-dimming regions in the direction from the first fixed region to the second light control region are $L_B+4\times(L_A-L_B)/5$, $L_B+3\times(L_A-L_B)/5$, $L_B+2\times(L_A-L_B)/5$, and $L_B+(L_A-L_B)/5$ respectively; in the case that the number of the first pixels, in the first light control region, arranged in the direction of the short side of the rectangle is greater than or equal to 7 and less than 9, the first region includes three consecutive first sub-dimming regions; and in the case that the grayscale value of the first region is adjusted, grayscale values of the three first sub-dimming regions in the direction from the first fixed region to the second light control region are $L_B+3\times(L_A-L_B)/4$, $L_B+2\times(L_A-L_B)/4$, and $L_B+(L_A-L_B)/4$ respectively; in the case that the number of the first pixels, in the first light control region, arranged in the direction of the short side of the rectangle is greater than or equal to 5 and less than 7, the first region includes two consecutive first sub-dimming regions; and in the case that the grayscale value of the first region is adjusted, grayscale values of the two first sub-dimming regions in the direction from the first fixed region to the second light control region are $L_B+2\times(L_A-L_B)/3$ and $L_B+(L_A-L_B)/3$ respectively; and in the case that the number of the first pixels, in the first light control region, arranged in the direction of the short side of the rectangle is greater than or equal to 3 and less than 5, the first region includes one ring of first pixels arranged along the boundary of the second light control region; and in the case that the grayscale value of the first region is adjusted, the grayscale value of the first region is $L_B+(L_A-L_B)/2$; wherein the $L_A$ is the grayscale value of the first fixed region, and the $L_B$ is the grayscale value of the second light control region.

Optionally, the first sub-image is a rectangular image; the second sub-image is a rectangular ring-shaped image intersecting with an outer boundary of the first sub-image; a shape of the first light control region is a rectangle; and the first pixel of the liquid crystal light control panel includes three first sub-pixels; in the case that a number of first pixels, in the first light control region, arranged in a direction of a short side of the rectangle is equal to 2, and an arrangement direction of the three first sub-pixels of the first pixel is the same as the direction of the short side of the rectangle, the first region includes at least two rows of first sub-pixels arranged in a direction of a long side of the rectangle; and in the case that the grayscale value of the first region is adjusted, the grayscale value of the first region is $L_B+(L_A-L_B)/2$; wherein the $L_A$ is the grayscale value of the first fixed region, and the $L_B$ is the grayscale value of the second light control region.

Optionally, the first sub-image is a rectangular image; the second sub-image is a rectangular ring-shaped image intersecting with an outer boundary of the first sub-image; in the case that a number of rings of first pixels, in the second light control region, arranged around the boundary of the first light control region is greater than or equal to 5, the second region includes four consecutive second sub-dimming regions; and in the case that the grayscale value of the second region is increased, grayscale values of the four second sub-dimming regions in the direction from the second fixed region to the first light control region are $L_B+(L_A-L_B)/5$, $L_B+2\times(L_A-L_B)/5$, $L_B+3\times(L_A-L_B)/5$, and $L_B+4\times(L_A-L_B)/5$ respectively; in the case that the number of the rings of the first pixels, in the second light control region, arranged around the boundary of the first light control region is equal to 4, the second region includes three consecutive second sub-dimming regions; and in the case that the grayscale value of the second region is increased, grayscale values of the three second sub-dimming regions in the direction from the second fixed region to the first light control region are $L_B+(L_A-L_B)/4$, $L_B+2\times(L_A-L_B)/4$, and $L_B+3\times(L_A-L_B)/4$ respectively; in the case that the number of the rings of the first pixels, in the second light control region, arranged around the boundary of the first light control region is equal to 3, the second region includes two consecutive second sub-dimming regions; and in the case that the grayscale value of the second region is increased, grayscale values of the two second sub-dimming regions in the direction from the second fixed region to the first light control region are $L_B+(L_A-L_B)/3$ and $L_B+2\times(L_A-L_B)/3$ respectively; and in the case that the number of the rings the first pixels, in the second light control region, arranged around the boundary of the first light control region is equal to 2, the second region includes one ring of first pixels arranged around the boundary of the first light control region; and in the case that the grayscale value of the second region is increased, the grayscale value of the second region is $L_B+(L_A-L_B)/2$; wherein the $L_A$ is the grayscale value of the first light control region, and the $L_B$ is the grayscale value of the second fixed region.

In another aspect, a display device is provided. The display device includes a liquid crystal light control panel and an LCD panel stacked together, and further includes:

a controller electrically connected to the liquid crystal light control panel and the LCD panel respectively, wherein the controller is configured to:

acquire a first sub-image and a second sub-image of an image to be displayed on the LCD panel, a boundary of the first sub-image being in contact with a boundary of the second sub-image, a grayscale value of the first sub-image being greater than a grayscale value of the second sub-image;

determine whether the grayscale value of the second sub-image is greater than a grayscale threshold;

in response to determining that the grayscale value of the second sub-image is greater than the grayscale threshold, adjust a grayscale value of a first region, which is in contact with a boundary of the first light control region, in a first light control region, such that an adjusted grayscale value of the first region is less than a grayscale value of the first region before adjustment, wherein the first light control region is a region of the liquid crystal light control panel corresponding to the first sub-image, and the second light control region is a region of the liquid crystal light control panel corresponding to the second sub-image;

in response to determining that the grayscale value of the second sub-image is not greater than the grayscale threshold, adjust a grayscale value of a second region, which is in contact with a boundary of the first light control region, in the second light control region, such that an adjusted grayscale value of the second region is greater than a grayscale value of the second region before adjustment; and control the LCD panel to display the image to be displayed, and control the liquid crystal light control panel to display a light control image, wherein a grayscale of the light control image is adjusted.

Optionally, the controller is configured to adjust the grayscale value of the first region based on a grayscale value of a first fixed region in the first light control region other than the first region and a grayscale value of the second light control region, such that the adjusted grayscale value of the first region is less than the grayscale value of the first fixed region and greater than the grayscale value of the second light control region.

Optionally, the first region includes at least two consecutive first sub-dimming regions; the first sub-dimming region includes at least one first pixel arranged along the boundary of the second light control region; and in response to adjusting the grayscale value of the first region, grayscale values of the at least two first sub-dimming regions are sequentially decreased along a direction from the first fixed region to the second light control region.

Optionally, the controller is configured to adjust the grayscale value of the second region based on a grayscale value of a second fixed region in the second light control region other than the second region and a grayscale value of the first light control region, such that the adjusted grayscale value of the second region is greater than the grayscale value of the second fixed region and less than the grayscale value of the first light control region.

Optionally, the second region includes at least two consecutive second sub-dimming regions; the second sub-dimming region includes at least one first pixel arranged along the boundary of the first light control region; and in response to adjusting the grayscale value of the second region, grayscale values of the at least two second sub-dimming regions are sequentially increased along a direction from the second fixed region to the first light control region.

Optionally, the display device further includes a scattering film, an optical adhesive film, a first polarizer and a second polarizer, wherein the scattering film and the optical adhesive film are disposed between the liquid crystal light control panel and the LCD panel, and the first polarizer and the second polarizer are disposed on two sides of the LCD panel respectively; a maximum number of the first sub-dimming regions in the first region and a maximum number of the second sub-dimming regions in the second region are determined based on a width of the first pixel of the liquid crystal light control panel and thicknesses and refractive indexes of the first polarizer, the LCD panel, the second polarizer, the scattering film and the optical adhesive film.

Optionally, the thickness of the optical adhesive film is greater than a thickness threshold, wherein the thickness threshold is determined based on a center-to-center distance of two adjacent sub-pixels of the LCD panel.

Optionally, the first sub-image is a rectangular image; the second sub-image is a rectangular ring-shaped image intersecting with an outer boundary of the first sub-image; and a shape of the first light control region is a rectangle; in the case that a number of first pixels, in the first light control region, arranged in a direction of a short side of the rectangle is greater than or equal to 9, the first region includes four consecutive first sub-dimming regions; and in the case that the grayscale value of the first region is adjusted, grayscale values of the four first sub-dimming regions in the direction from the first fixed region to the second light control region are $L_B+4\times(L_A-L_B)/5$, $L_B+3\times(L_A-L_B)/5$, $L_B+2\times(L_A-L_B)/5$, and $L_B+(L_A-L_B)/5$ respectively; in the case that the number of the first pixels, in the first light control region, arranged in the direction of the short side of the rectangle is greater than or equal to 7 and less than 9, the first region includes three consecutive first sub-dimming regions; and in the case that the grayscale value of the first region is adjusted, grayscale values of the three first sub-dimming regions in the direction from the first fixed region to the second light control region are $L_B+3\times(L_A-L_B)/4$, $L_B+2\times(L_A-L_B)/4$, and $L_B+(L_A-L_B)/4$ respectively; in the case that the number of the first pixels, in the first light control region, arranged in the direction of the short side of the rectangle is greater than or equal to 5 and less than 7, the first region includes two consecutive first sub-dimming regions; and in the case that the grayscale value of the first region is adjusted, grayscale values of the two first sub-dimming regions in the direction from the first fixed region to the second light control region are $L_B+2\times(L_A-L_B)/3$ and $L_B+(L_A-L_B)/3$ respectively; in the case that the number of the first pixels, in the first light control region, arranged in the direction of the short side of the rectangle is greater than or equal to 3 and less than 5, the first region includes one ring of first pixels arranged along the boundary of the second light control region; and in the case that the grayscale value of the first region is adjusted, the grayscale value of the first region is $L_B+(L_A-L_B)/2$; wherein the $L_A$ is the grayscale value of the first fixed region, and the $L_B$ is the grayscale value of the second light control region.

Optionally, the first sub-image is a rectangular image; the second sub-image is a rectangular ring-shaped image intersecting with an outer boundary of the first sub-image; a shape of the first light control region is a rectangle; and the first pixel of the liquid crystal light control panel includes three first sub-pixels; in the case that a number of first pixels, in the first light control region, arranged in a direction of a short side of the rectangle is equal to 2, and an arrangement direction of the three first sub-pixels of the first pixel is the same as the direction of the short side of the rectangle, the first region includes at least two rows of first sub-pixels arranged in a direction of a long side of the rectangle; and in the case that the grayscale value of the first region is adjusted, the grayscale value of the first region is $L_B+(L_A-L_B)/2$; wherein the $L_A$ is the grayscale value of the first fixed region, and the $L_B$ is the grayscale value of the second light control region.

Optionally, the first sub-image is a rectangular image; the second sub-image is a rectangular ring-shaped image intersecting with an outer boundary of the first sub-image; in the case that a number of rings of first pixels, in the second light control region, arranged around the boundary of the first light control region is greater than or equal to 5, the second region includes four consecutive second sub-dimming regions; and in the case that the grayscale value of the second region is increased, grayscale values of the four second sub-dimming regions in the direction from the second fixed region to the first light control region are $L_B+(L_A-L_B)/5$, $L_B+2\times(L_A-L_B)/5$, $L_B+3\times(L_A-L_B)/5$, and $L_B+4\times(L_A-L_B)/5$ respectively; in the case that the number of the rings of the first pixels, in the second light control region, arranged around the boundary of the first light control region is equal to 4, the second region includes three consecutive second sub-dimming regions; and in the case that the grayscale value of the second region is increased, grayscale values of the three second sub-dimming regions in the direction from the second fixed region to the first light control region are $L_B+(L_A-L_B)/4$, $L_B+2\times(L_A-L_B)/4$, and $L_B+3\times(L_A-L_B)/4$ respectively; in the case that the number of the rings of the first pixels, in the second light control region, arranged around the boundary of the first light control region is equal to 3, the second region includes two consecutive second sub-dimming regions; and in the case that the grayscale value of the second region is increased, grayscale values of the two second sub-dimming regions in the direction from the second fixed region to the first light control region are $L_B+(L_A-L_B)/3$ and $L_B+2\times(L_A-L_B)/3$ respectively; in the case that the number of the rings of the first pixels, in the second light control region, arranged around the boundary of the first light control region is equal to 2, the second region includes one ring of first pixels arranged around the boundary of the first light control region; and in the case that the grayscale value of the second region is increased, the grayscale value of the second region is $L_B+(L_A-L_B)/2$; and wherein the $L_A$ is the grayscale value of the first light control region, and the $L_B$ is the grayscale value of the second fixed region.

Optionally, the display device further includes a first driver and a second driver, wherein the first driver is connected to the liquid crystal light control panel and the controller, the second driver is connected to the LCD panel and the controller; and the controller is configured to control the LCD panel to display the image to be displayed through the first driver and control the liquid crystal light control panel to display a light control image through the second driver, wherein a grayscale of the light control image is adjusted.

In yet another aspect, a non-transitory computer-readable storage medium is provided. The non-transitory computer-readable storage medium stores an instruction thereon, wherein when the instruction runs on a processing component, the processing component is caused to perform the above display method.

BRIEF DESCRIPTION OF THE DRAWINGS

For clearer illustration of the technical solutions in the embodiments of the present disclosure, accompanying drawings required for describing the embodiments are briefly introduced hereinafter. Apparently, the accompanying drawings described hereinafter merely illustrate some embodiments of the present disclosure, and those ordinary skilled in the art may derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
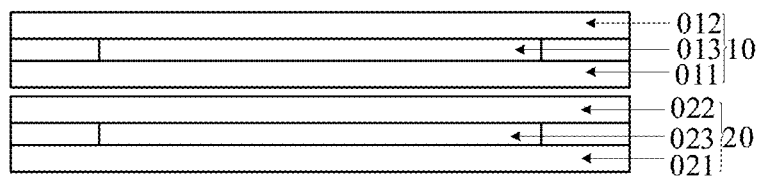
FIG. 1 is a schematic structure diagram of a display device according to an embodiment of the present disclosure.

Referring to FIG. 1, FIG. 1 is a schematic structure diagram of a display device according to an embodiment of the present disclosure. The display device may include an LCD panel 10 and a liquid crystal light control panel 20 stacked together. The LCD panel 10 may include a first array substrate 011, a color filter substrate 012 and a first liquid crystal layer 013, wherein the first array substrate 011 is disposed to face the color filter substrate 012 and the first liquid crystal layer 013 is disposed between the first array substrate 011 and the color filter substrate 012. The liquid crystal light control panel 20 may include a second array substrate 021, a cover panel 022 and a second liquid crystal layer 023, wherein the second array substrate 021 is disposed to face the cover panel 022 and the second liquid crystal layer 023 is disposed between the second array substrate 021 and the cover panel 022. The LCD panel 10 is configured to display an image. The liquid crystal light control panel 20 is configured to adjust luminance of respective regions based on an image to be displayed on the LCD panel 10. The liquid crystal light control panel 20 can greatly improve a contrast of the display device.

In the present disclosure, the LCD panel 10 includes a plurality of second pixels, and the liquid crystal light control panel 20 includes a plurality of first pixels. The first pixels may one-to-one correspond to the second pixels. When the display device displays an image, light emitted by each first pixel of the liquid crystal light control panel 20 may be emitted out after passing through the corresponding second pixel of the LCD panel 10. In the embodiment of the present disclosure, the first pixel may include three consecutive first sub-pixels arranged in one direction. The second pixel may include a red sub-pixel, a green sub-pixel and a blue sub-pixel arranged in one direction.

Assume that an image to be displayed on the LCD panel 10 in the display device is composed of two different grayscale images. For example, the two images include a first image, and a second image, wherein the second image surrounds the first image, and a boundary of the first image is overlapped with a boundary of the second image. It should be noted that each image of the image to be displayed on the LCD panel 10 is composed of a number of consecutive second pixels having the same grayscale value. In the case that a grayscale value of the first image of the image to be displayed is 255, three cases may be described hereinafter based on a grayscale of the second image of the image to be displayed.

Figure 2:
FIG. 2 is a schematic diagram of an image displayed on a LCD panel according to an embodiment of the present disclosure.
Figure 3:
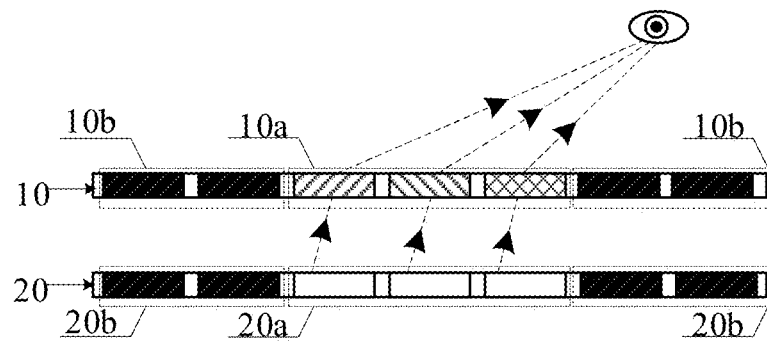
FIG. 3 is a diagram of a light path inside the display device when the LCD panel displays the image shown in FIG. 2.

In a first case, a grayscale value of the second image of the image to be displayed on the LCD panel 10 is in a range of 0-12. Referring to FIG. 2 and FIG. 3, FIG. 2 is a schematic diagram of an image displayed on a LCD panel according to an embodiment of the present disclosure, and FIG. 3 is a diagram of a light path inside the display device when the LCD panel displays the image shown in FIG. 2. The LCD panel 10 may include a region 10a and a region 10b, wherein the first image is disposed in the region 10a and the second image is disposed in the region 10b. Almost all of light emitted from a light control region 20a, on the liquid crystal light control panel 20, corresponding to the region 10a pass through the region 10a and emit out. In this case, when the LCD panel 10 displays the image, a ghost image is avoided.

Figure 4:
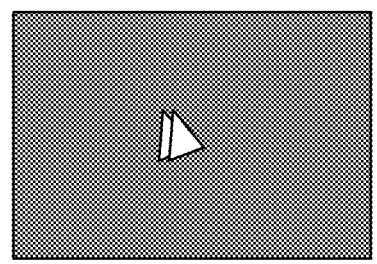
FIG. 4 is a schematic diagram of another image displayed on the LCD panel according to an embodiment of the present disclosure.
Figure 5:
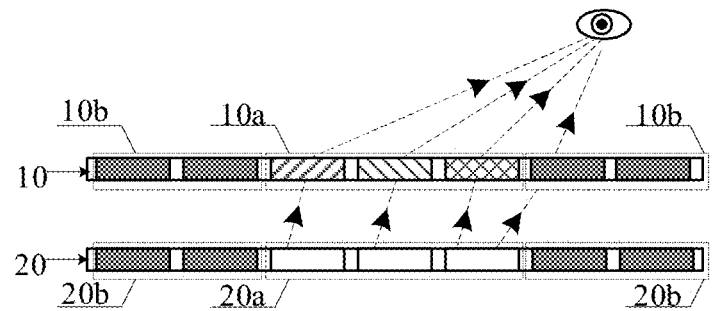
FIG. 5 is a diagram of a light path inside the display device when the LCD panel displays the image shown in FIG. 4.

In a second case, the grayscale value of the second image of the image to be displayed on the LCD panel 10 is in a range of 13-223. Referring to FIG. 4 and FIG. 5, FIG. 4 is a schematic diagram of another image displayed on a LCD panel according to an embodiment of the present disclosure, and FIG. 5 is a diagram of a light path inside the display device when the LCD panel displays the image shown in FIG. 4. Light emitted from the light control region 20a of the liquid crystal light control panel 20 is emitted out from both the region 10a and the region 10b, wherein the light control region 20a corresponds to the region 10a, the first image is disposed in the region 10a and the second image is disposed in the region 10b. In this way, when an angle between an observation direction of human eyes and a normal of a light-emitting surface of the LCD panel 10 is relatively large, a ghost image can easily occur, leading to a poor display quality of the LCD panel 10.

Figure 6:
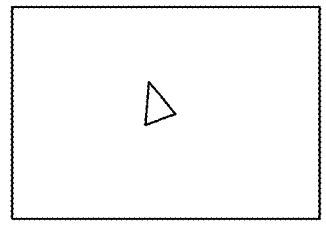
FIG. 6 is a schematic diagram of yet another image displayed on the LCD panel according to an embodiment of the present disclosure.
Figure 7:
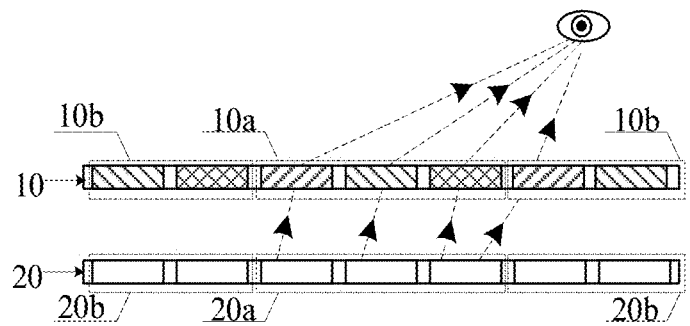
FIG. 7 is a diagram of a light path inside the display device when the LCD panel displays the image shown in FIG. 6.

In a third case, the grayscale value of the second image of the image to be displayed on the LCD panel 10 is in a range of 224-255. Referring to FIG. 6 and FIG. 7, FIG. 6 is a schematic diagram of yet another image displayed on a LCD panel according to an embodiment of the present disclosure, and FIG. 7 is a diagram of a light path inside the display device when the LCD panel displays the image shown in FIG. 6. All regions of the liquid crystal light control panel 20 emit light with a higher light intensity. In this way, the liquid crystal light control panel 20 is equivalent to a backlight source of the LCD panel 10, and a ghost image is avoided when the LCD panel 10 displays the image.

It can be seen from the above that when the grayscale value of the second image of the image to be displayed on the display device is in a range of 13-223, in the case that the display device displays the image, the ghost image occurs, leading to a poor display quality of the display device.

For the first case described above, the grayscale value of the second image of the image to be displayed on the display device is in the range of 0-12. Although the ghost image is avoided when the LCD panel 10 displays the image, a luminance of the first image of the image to be displayed on the LCD panel 10 is relatively low.

Figure 8:
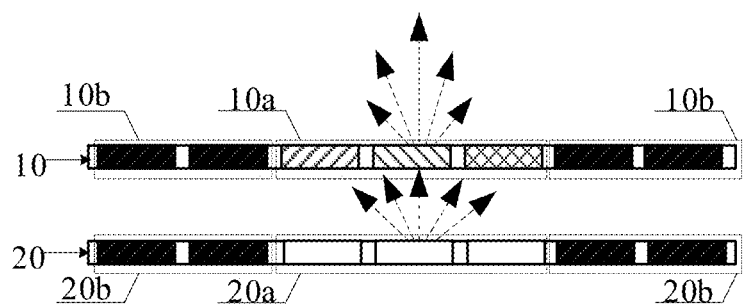
FIG. 8 is a diagram of a light path inside the display device when the LCD panel displays a bright line having a width of 1 pixel according to an embodiment of the present disclosure.

For example, the first image of the image to be displayed on the LCD panel 10 is assumed to be a bright line having a width of 1 pixel. Referring to FIG. 8, FIG. 8 is a diagram of a light path inside the display device when the LCD panel displays the bright line having the width of 1 pixel according to an embodiment of the present disclosure. The image displayed on the LCD panel 10 includes the region 10a and the region 10b, wherein the first image is disposed in the region 10a and the second image is disposed in the region 10b. In response to determining that the grayscale of the region 10a is 255 and the grayscale of the region 10b is 0, only the light control region 20a, on the liquid crystal light control panel 20, corresponding to the region 10a emits light, and a region of the liquid crystal light control panel 20 except the light control region 20a is in a black state, and cannot emit light. In this case, in the case that the observation direction of the human eyes is parallel to the normal of the light-emitting surface of the display device, the light emitted by the display device can enter the human eyes normally, such that the luminance of the first image in an observed image is not affected. When an angle between the observation direction of the human eyes and the normal of the light-emitting surface of the display device is relatively large, the intensity of the light emitted by the display device will quickly attenuate, and then the attenuated light enters the human eyes, leading to a relatively low luminance of the first image in the observed image.

Figure 9:
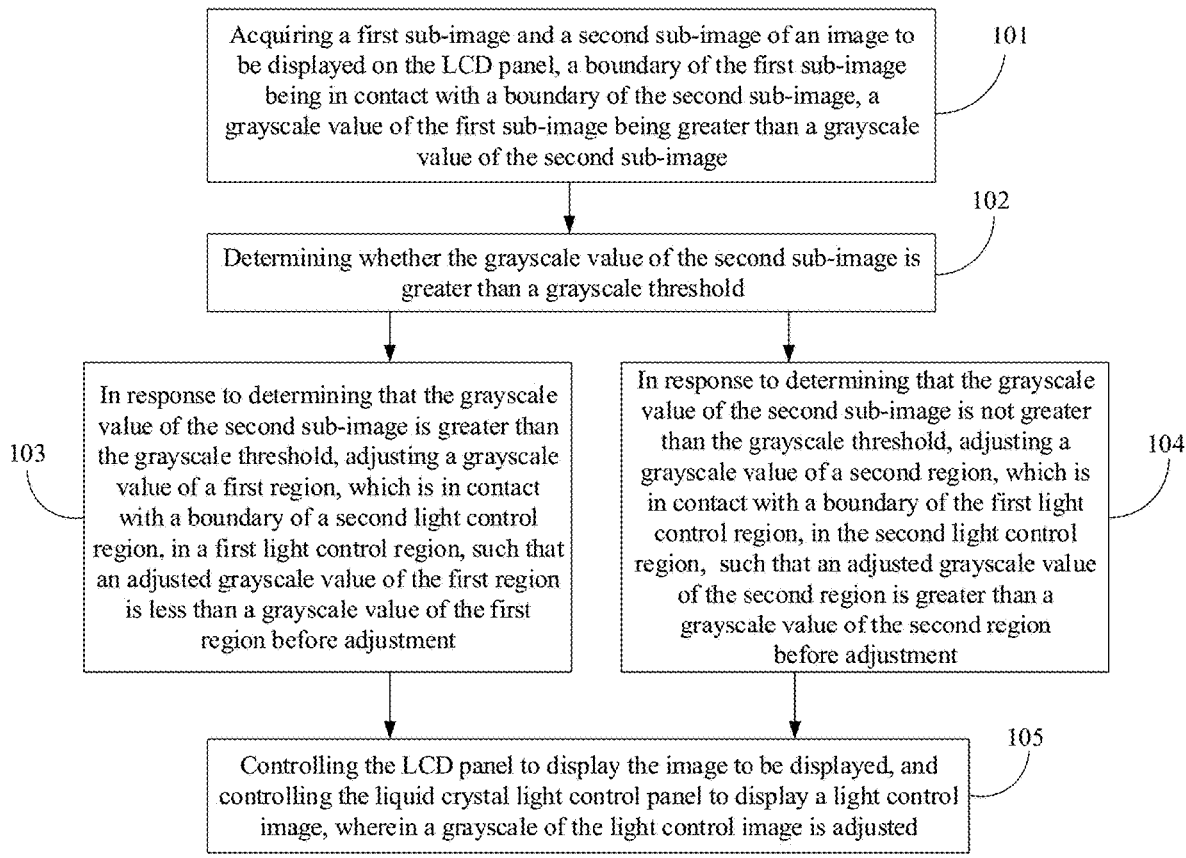
FIG. 9 is a flowchart of a display method according to an embodiment of the present disclosure.

Referring to FIG. 9, FIG. 9 is a flowchart of a display method according to an embodiment of the present disclosure. The display method is applicable to the display device shown in FIG. 1. The display method may include the following steps.

In 101, a first sub-image and a second sub-image of an image to be displayed on a LCD panel are acquired, a boundary of the first sub-image being in contact with a boundary of the second sub-image.

In the embodiment of the present disclosure, the image to be displayed on the LCD panel may be composed of a plurality of different sub-images. In the case that the LCD panel displays the image to be displayed, grayscale values of all second pixels in a region of each sub-image are the same. In this way, in the case that the LCD panel displays the image, the grayscale values of all the second pixels, in the region of the first sub-image, of the LCD panel are the same, and the grayscale values of all the second pixels, in the region of the second sub-image, of the LCD panel are the same.

In the present disclosure, the display device can acquire each sub-image of the image to be displayed prior to the LCD panel displaying the image to be displayed, such that the first sub-image and the second sub-image can be acquired, wherein the boundary of the first sub-image is in contact with the boundary of the second sub-image and a grayscale value of the first sub-image may be greater than a grayscale value of the second sub-image.

In 102, whether the grayscale value of the second sub-image is greater than a grayscale threshold is determined.

In the embodiment of the present disclosure, the display device may determine whether the grayscale value of the second sub-image is greater than the grayscale threshold, the grayscale value of the second sub-image being less than the grayscale of the first sub-image. For example, in the case that the display device determines that the grayscale value of the second sub-image is greater than the grayscale threshold, step 103 is performed; or in the case that the display device determines that the grayscale value of the second sub-image is not greater than the grayscale threshold, step 104 is performed.

It should be noted that the grayscale threshold in the present disclosure is acquired by experiments. For example, the grayscale threshold may be 12.

In 103, in response to determining that the grayscale value of the second sub-image is greater than the grayscale threshold, a grayscale value of a first region, which is in contact with a boundary of a second light control region, in a first light control region is adjusted, such that an adjusted grayscale value of the first region is less than a grayscale value of the first region before adjustment.

In the embodiment of the present disclosure, the first light control region is a region of the liquid crystal light control panel corresponding to the first sub-image, and the second light control region is a region of the liquid crystal light control panel corresponding to the second sub-image.

It should be noted that in the present disclosure, the sub-image displayed on the LCD panel corresponding to the light control region of the liquid crystal light control panel means that the case that the LCD panel displays the sub-image, a boundary of an orthographic projection of the sub-image on the liquid crystal light control panel is coincident with a boundary of the light control region. Moreover, the grayscale value of the second pixel in the region of each sub-image corresponds to the grayscale value of the first pixel in the corresponding light control region. For example, the grayscale value of the first pixel in the corresponding light control region may be acquired by multiplying the grayscale value of the second pixel in the region of each sub-image by a coefficient k (for example, k=1).

In 104, in response to determining that the grayscale value of the second sub-image is not greater than the grayscale threshold, a grayscale value of a second region, which is in contact with a boundary of the first light control region, in the second light control region is adjusted, such that an adjusted grayscale value of the second region is greater than a grayscale value of the second region before adjustment.

In 105, the LCD panel is controlled to display the image to be displayed, and the liquid crystal light control panel is controlled to display a light control image, wherein a grayscale of the light control image is adjusted.

It should be noted that in the case that the LCD panel of the display device displays the image to be displayed, the liquid crystal light control panel in the display device displays a light control image corresponding to the image to be displayed synchronously. The light control image is composed of a plurality of different light control regions corresponding to a plurality of different sub-images. In the embodiment of the present disclosure, in response to controlling the LCD panel to display the image to be displayed, the display device further simultaneously controls the liquid crystal light control panel to display the light control image, wherein the grayscale of the light control image is adjusted.

In this way, a probability of an occurrence of a ghost image of the image displayed on the display device is relatively low, and the luminance of the image is relatively high, such that the display quality of the display device is effectively improved.

In summary, in the display method according to the embodiments of the present disclosure, the boundary of the first sub-image is in contact with the boundary of the second sub-image, and the grayscale value of the second sub-image is less than the grayscale of the first sub-image. In response to determining that the grayscale value of the second sub-image is greater than the grayscale threshold, the grayscale value of the first region, which is in contact with the boundary of the second light control region, in the first light control region is decreased. In this way, after passing through the region of the second sub-image on the LCD panel, light intensity of light emitted from the first region with the relatively low grayscale value is low. Thus, the probability of the occurrence of ghost images is effectively reduced, improving the display quality of the display device. Further, in response to determining that the grayscale value of the second sub-image is not greater than the grayscale threshold, the grayscale value of the second region, which is in contact with the boundary of the first light control region, in the second light control region is increased. In this way, the attenuated light can be compensated by the second region with the relatively high grayscale value, thus increasing a luminance of the first sub-image.

For the above 103, in response to determining that the grayscale value of the second sub-image is greater than the grayscale threshold, the grayscale value of the first region, which is in contact with the boundary of the second light control region, in the first light control region is adjusted, such that the adjusted grayscale value of the first region is less than the grayscale value of the first region before adjustment. That is, in response to determining that the grayscale value of the second sub-image is greater than the grayscale threshold, the grayscale value of the first region is decreased. It should be noted that the grayscale value of the first region before adjustment is an initial grayscale value of the first light control region, and the adjusted grayscale value of the first region is less than the initial grayscale value of the first light control region.

Figure 10:
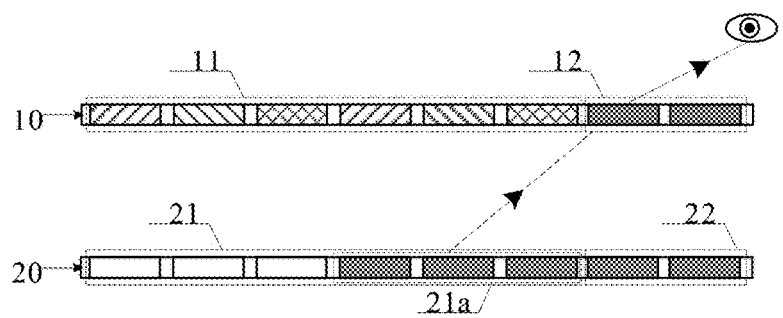
FIG. 10 is a schematic diagram of a light path in a display device according to an embodiment of the present disclosure.

Exemplarily, referring to FIG. 10, FIG. 10 is a schematic diagram of a light path in a display device according to an embodiment of the present disclosure. Assume that when the LCD panel 10 in the display device displays an image to be displayed, the boundary of the first sub-image 11 is overlapped with the boundary of the second sub-image 12 of the image to be displayed, the grayscale value of the first sub-image 11 is greater than the grayscale value of the second sub-image 12, and the grayscale value of the second sub-image 12 is greater than the grayscale threshold. When the first light control region 21 and the second light control region 22 normally provide light to the LCD panel 10 and an angle between an observation direction of human eyes and a normal of the light-emitting surface of the LCD panel 10 is relatively large, wherein the first light control region 21 and the second light control region 22 are on the liquid crystal light control panel 20, the first light control region 21 corresponds to the first sub-image 11, and the second light control region 22 corresponds to the second sub-image 12, the human eyes can easily observe a ghost image after light emitted from the first light control region 21 passes through the region of the second sub-image 12 on the LCD panel 10 and enters the human eyes. After the grayscale value of the first region 21a in the first light control region 21 is decreased, the light intensity of the light emitted from the first region 21a is effectively reduced, wherein the first region 21a is coincided with the boundary of the second light control region 22. Thus, when the angle between the observation direction of the human eyes and the normal of the light-emitting surface of the LCD panel 10 is relatively large, it is not easy for the human eyes to observe the ghost image after the light emitted from the first region 21a with the relatively low light intensity passes through the region of the second sub-image 12 on the LCD panel 10 and enters the human eyes.

In the embodiment of the present disclosure, in the case that the grayscale value of the second sub-image is greater than the grayscale threshold, it is required to determine a maximum width of the first region in the direction perpendicular to the boundary of the second light control region, to completely eliminate the ghost image when the display device displays the image to be displayed. The maximum width of the first region in the direction perpendicular to the boundary of the second light control region is determined based on a refractive index and a thickness of each film layer in the display device.

Figure 11:
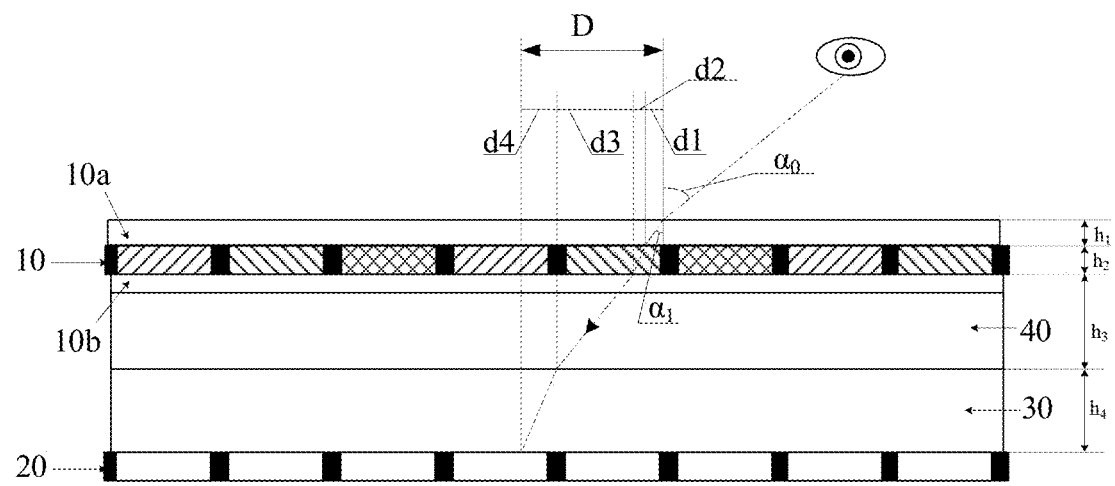
FIG. 11 is a schematic diagram of a light refraction in a display device according to an embodiment of the present disclosure.

Exemplarily, referring to FIG. 11, FIG. 11 is a schematic diagram of a light refraction in a display device according to an embodiment of the present disclosure. Since the light path is reversible, in order to facilitate calculation, the light path of FIG. 11 is that light emitted from the human eyes reaches the liquid crystal light control panel 20 after passing through the film layer in the display device. The display device may further include a first polarizer 10a, a second polarizer 10b, a scattering film 40 and an optical adhesive film 30, wherein the first polarizer 10a and the second polarizer 10b are disposed on two sides of the LCD panel 10 respectively, and the scattering film 40 and an optical adhesive film 30 are disposed between the LCD panel 10 and the liquid crystal light control panel 20. The maximum width of the first region in the direction perpendicular to the boundary of the second light control region may be determined based on a width of the first pixel of the liquid crystal light control panel 20 and the thicknesses and the refractive indexes of all the first polarizer 10a, the LCD panel 10, the second polarizer 10b, the scattering film 40 and the optical adhesive film 30.

Assume that the refractive index of environment of the display device is no; the angle between the observation direction of the human eyes and the normal of the light-emitting surface of the LCD panel 10 is $\alpha_0$; the refractive index of the first polarizer 10a is $n_1$, and the thickness of the first polarizer 10a is $h_1$; the refractive index of the display panel 10 is $n_2$, and the thickness of the display panel 10 is $h_2$; the refractive index of each of the second polarizer 10b and the scattering film 40 is $n_3$, and the sum of the thicknesses of the second polarizer 10b and the scattering film 40 is $h_3$; the refractive index of the optical adhesive film 30 is $n_4$, and the thickness of the optical adhesive film 30 is $h_4$; and the refraction angle of the light in the first polarizer 10a is $\alpha_1$.

Then, according to the law of refraction, $n_0 \times \sin \alpha_0 = n_1 \times \sin \alpha_1$, $\alpha_1 = \arcsin(n_0/n_1 \times \sin \alpha_0)$ may be deduced.

According to a trigonometric function, $d1 = h_1 \times \tan[\arcsin(n_0/n_1 \times \sin \alpha_0)]$.

Similarly, $d2 = h_2 \times \tan[\arcsin(n_1/n_2 \times \sin \alpha_0)]$;

$d3 = h_3 \times \tan[\arcsin(n_2/n_3 \times \sin \alpha_0)]$; and $d4 = h_4 \times \tan[\arcsin(n_3/n_4 \times \sin \alpha_0)]$.

The following formulas may be acquired by substituting the specific values of the thicknesses and refractive indexes of the first polarizer 10a, the LCD panel 10, the second polarizer 10b, the scattering film 40 and the optical adhesive film 30 into the above formulas:

$d1 = 0.155 \times \tan[\arcsin(0.685 \times \sin \alpha_0)]$;

$d2 = 1 \times \tan[\arcsin(0.25 \times \sin \alpha_0)]$;

$d3 = 0.445 \times \tan[\arcsin(0.685 \times \sin \alpha_0)]$; and $d4 = 0.25 \times \tan[\arcsin(0.68 \times \sin \alpha_0)]$.

Therefore, with respect to a distance D in a horizontal direction between a landing point of the light on the light-emitting surface of the LCD panel 10 (that is, the surface of the first polarizer 10a distal from the liquid crystal panel 10) and a landing point of the light passing through the LCD panel 10, the scattering film 40 and the optical adhesive film 30 on the light-emitting surface of the liquid crystal light control panel 20, D=d1+d2+d3+d4.

In the case that the angle between the observation direction of the human eyes and the normal of the light-emitting surface of the LCD panel 10 is less than or equal to 45°, in order to avoiding the observation of the ghost image, 45° is substituted into the above formula, such that D=0.980 mm may be acquired. In this way, in the case that the width of the first pixel of the liquid crystal light control panel 20 is 0.27 mm, since 4×0.270=1.08 mm>0.980 mm, the maximum width of the first region in the direction perpendicular to the boundary of the second light control region may be the width of four first pixels. In the case that the grayscale value of each first pixel in the first region is decreased, it is difficult for the human eyes to observe the ghost image in an observation range within 45°.

In the embodiments of the present disclosure, there are various ways capable of decreasing the grayscale value of the first region. The embodiments of the present disclosure take the following two possible implementations as examples for schematic illustration.

In a first possible implementation, the grayscale value of the first region may be decreased to the grayscale value of the second light control region by the display device. In the case that the grayscale value of the first region is decreased, the grayscale value of the first region is equal to the grayscale value of the second light control region.

In a second possible implementation, adjusting the grayscale value of the first region, which is in contact with the boundary of the second light control region, in the first light control region by the display device may include:

adjusting the grayscale value of the first region based on a grayscale value of a first fixed region in the first light control region other than the first region and the grayscale value of the second light control region, such that an adjusted grayscale value of the first region is less than the grayscale value of the first fixed region and greater than the grayscale value of the second light control region.

In the embodiment of the present disclosure, the grayscale value of the first region may be decreased by the display device based on the grayscale value of the first fixed region and the grayscale value of the second light control region. In the case that the adjusted grayscale value of the first region is less than the grayscale value of the first fixed region and greater than the grayscale value of the second light control region, a probability of a sudden change in luminance between the first sub-image and the second sub-image may be reduced when the display device displays the image to be displayed.

Exemplarily, the first region includes at least two consecutive first sub-dimming regions. The first sub-dimming region includes at least one first pixel arranged along the boundary (that is, the boundary in contact with the first region in the second light control region) of the second light control region. In response to adjusting the grayscale value of the first region, grayscale values of the at least two first sub-dimming regions are sequentially decreased along a direction from the first fixed region to the second light control region. In this way, the probability of the sudden change in the luminance between the first sub-image and the second sub-image may be further reduced when the display device displays the image to be displayed.

It should be noted that based on the above embodiment, the maximum number of the first sub-dimming regions in the first region is determined based on the width of the first pixel of the liquid crystal light control panel 20 and the thicknesses and the refractive indexes of the first polarizer 10a, the LCD panel 10, the second polarizer 10b, the scattering film 40 and the optical adhesive film 30. Exemplarily, in the case that the maximum width of the first region in the direction perpendicular to the boundary of the second light control region is equal to the width of the four first pixels, the maximum number of the first sub-dimming regions in the first region is 4.

In the present disclosure, in response to adjusting the grayscale value of the first region, the grayscale values of the first fixed region, the at least two first sub-dimming regions, and the second light control region are decreased in an arithmetic sequence along the direction from the first fixed region to the second light control region. Therefore, evenly transition of the grayscale value of the first fixed region to the grayscale value of the second light control region may be achieved, such that the probability of the sudden change in the luminance between the first sub-image and the second sub-image may be minimized when the display device displays the image to be displayed, thus further improving the display quality of the display device.

Figure 12:
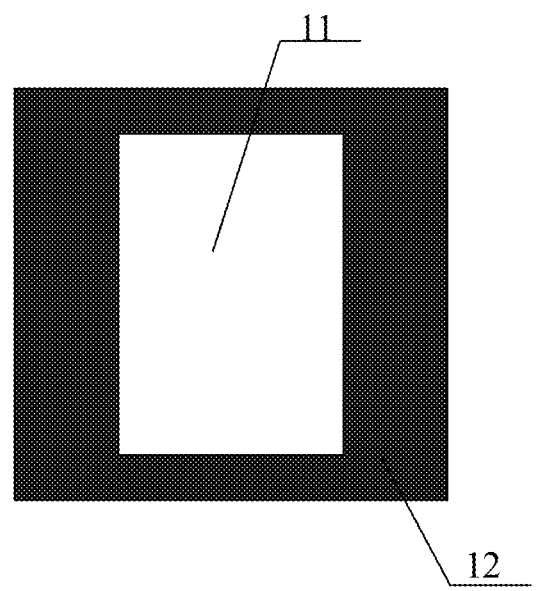
FIG. 12 is a schematic diagram of a first sub-image and a second sub-image according to an embodiment of the present disclosure.

Referring to FIG. 12, FIG. 12 is a schematic diagram of a first sub-image and a second sub-image according to an embodiment of the present disclosure. Assume that the first sub-image 11 is a rectangular image, and the second sub-image 12 is a rectangular ring-shaped image intersecting with an outer boundary of the first sub-image. Therefore, the first light control region of the liquid crystal light control panel is a rectangular region, the second light control region thereof is a rectangular ring-shaped region, and the first region in the first light control region intersecting with a boundary of the second light control region is also a rectangular ring-shaped region. It should be noted that a width of the first region is related to a number of first pixels in the first light control region arranged in a direction of a short side of the rectangle. The embodiments of the present disclosure take the following five cases as examples for illustration.

In a first case, in the case that a number of first pixels, in the first light control region, arranged in a direction of a short side of the rectangle is greater than or equal to 9, the first region includes four consecutive first sub-dimming regions.

Figure 13:
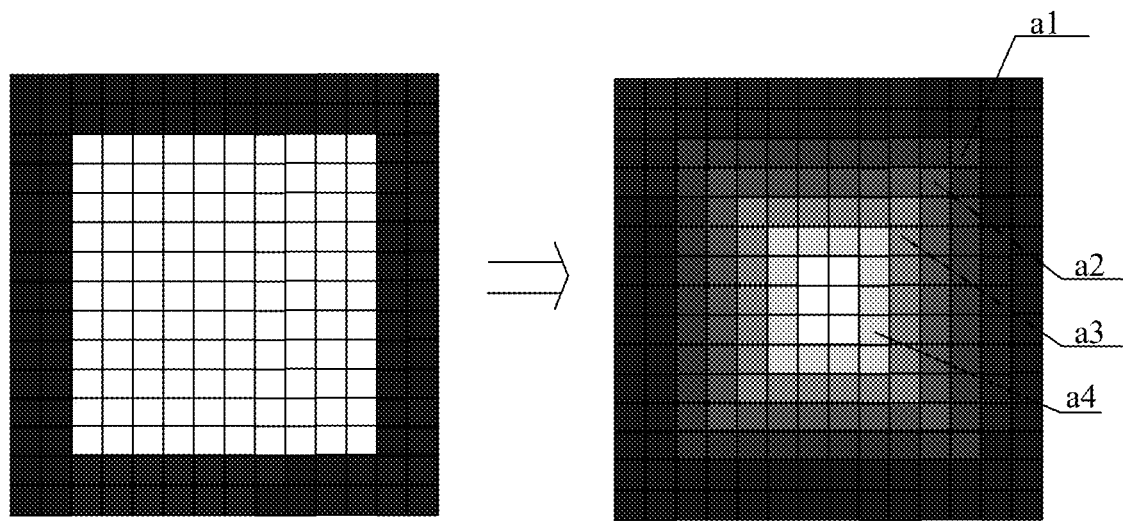
FIG. 13 is a schematic diagram of adjusting a grayscale of a first region according to an embodiment of the present disclosure.

Exemplarily, referring to FIG. 13, FIG. 13 is a schematic diagram of adjusting a grayscale of the first region according to an embodiment of the present disclosure. The four first sub-dimming regions in the first region includes a first sub-dimming region a1, a first sub-dimming region a2, a first sub-dimming region a3 and a first sub-dimming region a4. Assume that prior to adjusting the grayscale value of the first region in the first light control region, the grayscale value of the first light control region 21 is $L_A$. That is, after adjusting the grayscale value of the first region in the first light control region, the grayscale value of the first fixed region in the first light control region is $L_A$, and the grayscale value of the second light control region is $L_B$.

Then, in the case that the grayscale value of the first region in the first light control region are adjusted, grayscale values of the four consecutive first sub-dimming regions in a direction from the first fixed region to the second light control region are $L_B+4\times(L_A-L_B)/5$, $L_B+3\times(L_A-L_B)/5$, $L_B+2\times(L_A-L_B)/5$, and $L_B+(L_A-L_B)/5$ respectively. That is, a grayscale value of the first sub-dimming region a1 is $L_B+(L_A-L_B)/5$; a grayscale value of the first sub-dimming region a2 is $L_B+2\times(L_A-L_B)/5$, a grayscale value of the first sub-dimming region a3 is $L_B+3\times(L_A-L_B)/5$; and a grayscale value of the first sub-dimming region a4 is $L_B+4\times(L_A-L_B)/5$.

In a second case, in the case that the number of the first pixels, in the first light control region, arranged in the direction of the short side of the rectangle is greater than or equal to 7 and less than 9, the first region includes three consecutive first sub-dimming regions. Assume that the grayscale value of the first fixed region is $L_A$, and the grayscale value of the second light control region is $L_B$.

Then, in the case that the grayscale value of the first region in the first light control region is adjusted, grayscale values of the three consecutive first sub-dimming regions in the direction from the first fixed region to the second light control region are $L_B+3\times(L_A-L_B)/4$, $L_B+2\times(L_A-L_B)/4$, and $L_B+(L_A-L_B)/4$ respectively.

In a third case, in the case that the number of the first pixels, in the first light control region, arranged in the direction of the short side of the rectangle is greater than or equal to 5 and less than 7, the first region includes two consecutive first sub-dimming regions. Assume that the grayscale value of the first fixed region is $L_A$, and the grayscale value of the second light control region is $L_B$.

Then, in the case that the grayscale value of the first region in the first light control region is adjusted, grayscale values of the two consecutive first sub-dimming regions in the direction from the first fixed region to the second light control region are $L_B+2\times(L_A-L_B)/3$ and $L_B+(L_A-L_B)/3$ respectively.

In a fourth case, in the case that the number of the first pixels, in the first light control region, arranged in the direction of the short side of the rectangle is greater than or equal to 3 and less than 5, the first region includes one ring of first pixels arranged along the boundary of the second light control region. Assume that the grayscale value of the first fixed region is $L_A$, and the grayscale value of the second light control region is $L_B$.

Then, in the case that the grayscale value of the first region in the first light control region is adjusted, the grayscale value of the first region is $L_B+(L_A-L_B)/2$.

In a fifth case, in the case that the number of the first pixels, in the first light control region, arranged in the direction of the short side of the rectangle is equal to 2, and an arrangement direction of the three first sub-pixels of the first pixel is perpendicular to a direction of a long side of the rectangle, two possible implementations are described hereinafter.

In one possible implementation, the grayscale values of the first pixels in the first light control region are not adjusted. In another possible implementation, the grayscale value of the first light control region is adjusted at a sub-pixel level. In this case, the first region in the first light control region includes a plurality of first sub-pixels.

Exemplarily, in the case that the number of the first pixels, in the first light control region, arranged in the direction of the short side of the rectangle is less than or equal to 2, and the arrangement direction of the three first sub-pixels of the first pixel is the same as the direction of the long side of the rectangle, the first region includes at least two rows of first sub-pixels arranged in the direction of the short side of the rectangle. It should be noted that the at least two rows of first sub-pixels in the first region are symmetrically arranged, and the first region includes 4 rows of first sub-pixels at most.

Assume that the grayscale value of the first fixed region is $L_A$, and the grayscale value of the second light control region is $L_B$. Then, in the case that the grayscale value of the first region is adjusted, the grayscale value of the first region is $L_B+(L_A-L_B)/2$.

In the case that an arrangement direction of at least two first sub-pixels of the first pixel is the same as the direction of the short side of the rectangle, two possible implementations are described hereinafter.

In one possible implementation, the grayscale values of the first pixels in the first light control region are not adjusted. In another possible implementation, the grayscale value of the first light control region is adjusted at a sub-pixel level. In this case, the first region in the first light control region includes a plurality of first sub-pixels.

Exemplarily, in the case that the number of the first pixels, in the first light control region, arranged in the direction of the short side of the rectangle is less than or equal to 2, and the arrangement direction of the three first sub-pixels of the first pixel is the same as the direction of the short side of the rectangle, the first region includes at least two rows of first sub-pixels arranged in the direction of the long side of the rectangle. It should be noted that the at least two rows of first sub-pixels in the first region are symmetrically arranged, and the first region includes four rows of first sub-pixels at most.

It should be noted that the first region may further include: at least two rows of first sub-pixels arranged in the direction of the short side of the rectangle; the at least two rows of first sub-pixels, in the first region, arranged in the direction of the short side of the rectangle are symmetrically arranged; and the first region includes at most eight rows of first sub-pixels arranged in the direction of the short side of the rectangle. A number of rows of first sub-pixels, in the first region, arranged in the direction of the short side of the rectangle is related with a number of first pixels, in the first light control region, arranged in the direction of the long side of the rectangle, which may be referred to the first case to the fourth case mentioned above and not repeated in the embodiment of the present disclosure.

Assume that the grayscale value of the first fixed region is $L_A$, and the grayscale value of the second light control region is $L_B$. Then, in the case that the grayscale value of the first region in the first light control region is adjusted, the grayscale value of the first region is $L_B+(L_A-L_B)/2$.

However, in response to determining that the number of the first pixels, in the first light control region, arranged in the direction of the short side of the rectangle is less than or equal to 2, grayscale value adjustment is performed in the first light control region at a sub-pixel level, and color cast may easily occur.

Figure 14:
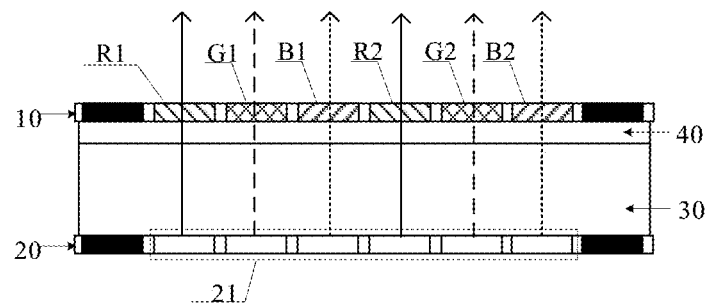
FIG. 14 is a diagram of a light path inside the display device prior to adjusting a grayscale value of a first light control region according to an embodiment of the present disclosure.
Figure 15:
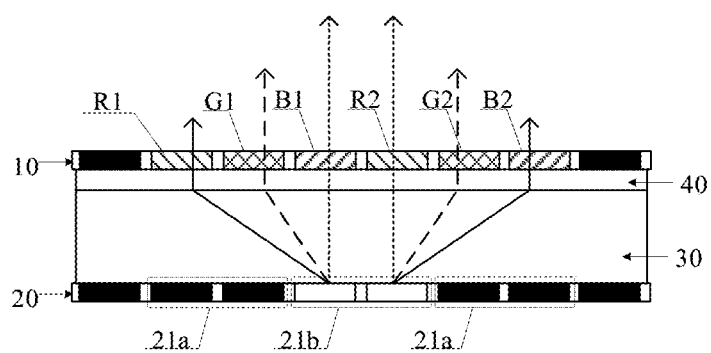
FIG. 15 is a diagram of a light path inside the display device in response to determining that the grayscale value of the first light control region is adjusted according to an embodiment of the present disclosure.

Exemplarily, referring to FIG. 14 and FIG. 15, FIG. 14 is a diagram of a light path inside the display device prior to adjusting a grayscale value of a first light control region according to an embodiment of the present disclosure; and FIG. 15 is a diagram of a light path inside the display device in response to determining that the grayscale value of the first light control region is adjusted according to an embodiment of the present disclosure. The second pixel of the LCD panel 10 may include a red sub-pixel R, a green sub-pixel G and a blue sub-pixel B.

As shown in FIG. 14, in response to not adjusting the grayscale value of the first light control region 21 of the liquid crystal light control panel 20, the light emitted from the first light control region 21 evenly pass through the red sub-pixel R, the green sub-pixel G and the blue sub-pixel B and emit out. In this case, the image displayed on the LCD panel 10 is free from color cast.

As shown in FIG. 15, in response to determining that the grayscale value of the first light control region 21 of the liquid crystal light control panel 20 is adjusted, the grayscale value of the first sub-pixel in the first region 21a is decreased. In this case, the light emitted from the first fixed region 21b is divergent, light paths of the light emitted from the first fixed region 21b are different and a distance between the first fixed region 21b and the red sub-pixel R, a distance between the first fixed region 21b and the green sub-pixel G, and a distance between the first fixed region 21b and the blue sub-pixel B are different. Therefore, a mixing ratio of the light emitted from the red sub-pixel R, the green sub-pixel G and the blue sub-pixel B is affected, resulting in the color cast of the image displayed on the LCD panel 10.

In order to avoid the color cast of the image displayed on the LCD panel 10, it is required to ensure that the thickness of the optical adhesive film 30 in the display device is greater than a thickness threshold, wherein the optical adhesive film 30 is between the LCD panel 10 and the liquid crystal light control panel 20. The thickness threshold is determined based on a center-to-center distance of two sub-pixels of the LCD panel.

Figure 16:
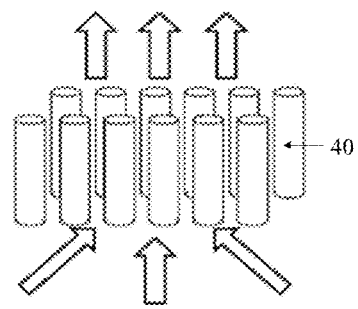
FIG. 16 is a schematic structure diagram of a scattering film according to an embodiment of the present disclosure.

Exemplarily, referring to FIG. 15, after passing through the optical adhesive film 30, the light emitted from the liquid crystal light control panel 20 is directed to the scattering film 40. Referring to FIG. 16, FIG. 16 is a schematic structure diagram of a scattering film according to an embodiment of the present disclosure. The scattering film 40 is provided with a collimating function, and is configured to change the direction of light incident on the scattering film 40, such that the light can exit in a direction perpendicular to the scattering film 40. In this way, after passing through the scattering film 40, the light emitted from the liquid crystal light control panel 20 enters the LCD panel 10 along a direction perpendicular to the LCD panel 10.

Figure 17:
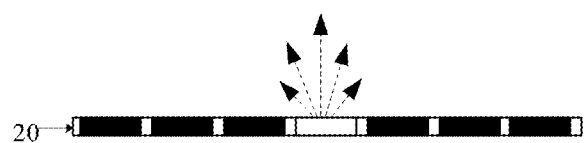
FIG. 17 is a schematic diagram of light emitted by a single first sub-pixel according to an embodiment of the present disclosure.
Figure 18:
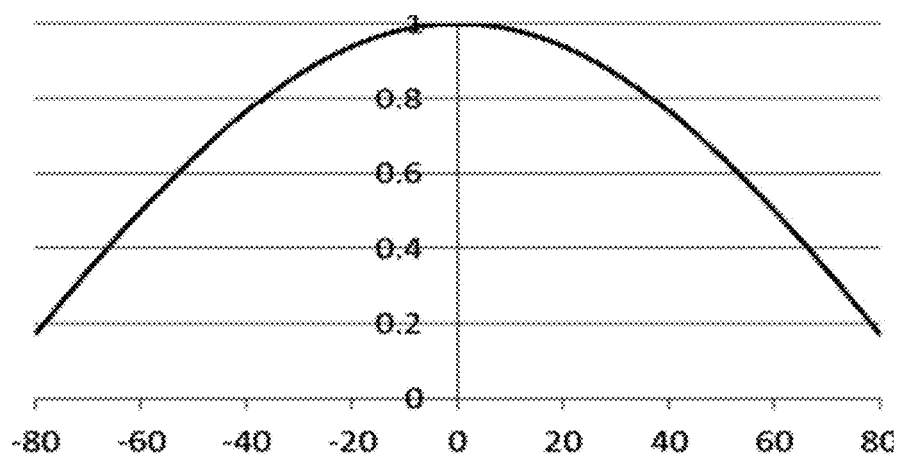
FIG. 18 is a schematic diagram of light intensity distribution in different directions of light emitted by the single first sub-pixel shown in FIG. 17.

Light emitted by a single first sub-pixel of the liquid crystal light control panel 20 is as shown in FIG. 17 and FIG. 18. FIG. 17 is a schematic diagram of light emitted by a single first sub-pixel according to an embodiment of the present disclosure; and FIG. 18 is a schematic diagram of light intensity distribution in different directions of the light emitted by the single first sub-pixel shown in FIG. 17. In FIG. 18, the abscissa indicates angles θ of the light emitted by the single first sub-pixel in various directions; and the ordinate indicates light intensities L of the light. A spatial distribution model of the light intensities of the light emitted by the single first sub-pixel is a Lambertian, and the light intensities in different directions may be calculated according to the formula: $L_\theta=L_0\times\cos(\theta)$. Here, the $L_0$ indicates a light intensity when the light emitted by the first sub-pixel is emitted out in a direction perpendicular to the liquid crystal light control panel 20. When the light is emitted out and spreads in a medium, a relationship between the light intensity L of the light and a propagation distance d is $L \propto 1/d^2$. That is, the light intensity L is proportional to the reciprocal of the square of the distance d.

Figure 19:
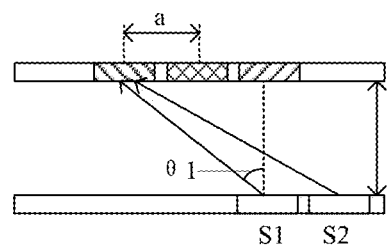
FIG. 19 is a schematic diagram of a calculation of a light intensity of the light in the display device shown in FIG. 15.

Referring to FIG. 15 and FIG. 19, FIG. 19 is a schematic diagram of a calculation principle of a light intensity of the light in the display device shown in FIG. 15. Assume that the first sub-image on the display panel 10 is a pure white image. Then, it is required to ensure that after passing through a region of the first sub-image of the LCD panel, the light emitted from the first sub-pixel S1 and the first sub-pixel S2 can be mixed into white light normally. For convenience of calculation, it may be defined that one portion of red light, one portion of green light and one portion of blue light can be mixed into the white light, such that a ratio of red light, green light and blue light is 1:1:1.

For the red sub-pixel R1, the light emitted by the first sub-pixels S1 and S2 is red light after passing through the red sub-pixel R1. Assume that a relative luminous intensity of the first sub-pixel S1 in a direction of an angle θ1 is $L_{\theta 1}$; a distance between the first sub-pixel S1 and the red sub-pixel R1 is $D_{R1}$; the luminous intensity of the light emitted by the first sub-pixel S1, after reaching the red sub-pixel R1, is L1; the center-to-center distance of the two sub-pixels of the LCD panel 10 is a; and the thickness of the optical adhesive film 30 in the display device is b. Then, the following formulas may be acquired according to a geometric relationship.

$$\theta 1 = \arctan(2 \times a/b); L_{\theta 1} = \cos[\arctan(2 \times a/b)]; D_{R1} = [(2a)^2 + b^2]^{0.5}; \text{ and}$$

according to the above formulas, $L1 = L_{\theta 1}/D_{R1}^2 = \cos[\arctan(2 \times a/b)]/[(2a)^2 + b^2]$.

Similarly, it can be acquired that the luminous intensity of the light emitted by the first sub-pixel S2, after reaching the red sub-pixel R1 is $L2 = \cos[\arctan(3 \times a/b)]/[(3a)^2 + b^2]$.

In this way, the light intensity $L_{R1}$ of the red light emitted from the red sub-pixel R1 satisfies the following relationship:

$$L_{R1} = L1 + L2 = \cos[\arctan(2 \times a/b)]/[(2a)^2 + b^2] + \cos[\arctan(3 \times a/b)]/[(3a)^2 + b^2].$$

Similarly, it can be acquired that the light intensity $L_{G1}$ of the green light emitted from the green sub-pixel G1 satisfies the following relationship:

$$L_{G1} = \cos[\arctan(a/b)]/[a^2 + b^2] + \cos[\arctan(2 \times a/b)]/[(2a)^2 + b^2].$$

Similarly, it can be acquired that the light intensity $L_{B1}$ of the blue light emitted from the blue sub-pixel B1 satisfies the following relationship:

$$L_{B1} = b^2 + \cos[\arctan(a/b)]/[a^2 + b^2].$$

It can be seen from the above that the light intensities of the light emitted from the red sub-pixel R1, the green sub-pixel G1 and the blue sub-pixel B1 are only related to the center-to-center distance a of the two sub-pixels of the LCD panel 10 and the thickness b of the optical adhesive film 30 in the display device.

According to the same method, it can be known that each of the light intensity $L_{R2}$ of the red light emitted from the red sub-pixel R2, the light intensity $L_{G2}$ of the green light emitted from the green sub-pixel G2, and the light intensity $L_{B2}$ of the blue light emitted from the blue sub-pixel B2 is only related to the center-to-center distance a of the two sub-pixels of the LCD panel 10 and the thickness b of the optical adhesive film 30 in the display device.

Assume further that the center-to-center distance a of two sub-pixels of the LCD panel 10 is a=90 microns. Then, by substituting different values b to achieve $(L_{R1}+L_{R2}):(L_{G1}+L_{G2}):(L_{B1}+L_{B2}) \approx 1:1:1$, the minimum thickness of the optical adhesive film 30 may be determined on the premise of avoiding the color cast in the process of displaying the image on the LCD panel 10. The minimum thickness of the optical adhesive film 30 is the thickness threshold in the above embodiment.

Figure 20:
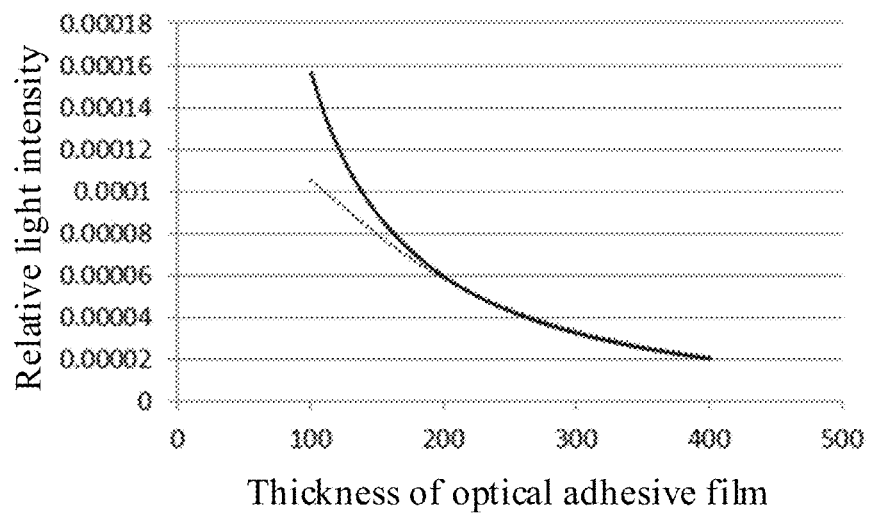
FIG. 20 is a graph of a relationship between relative light intensities of red light, green light and blue light and thickness of optical adhesive film according to an embodiment of the present disclosure.

Exemplarily, referring to FIG. 20, FIG. 20 is a graph of a relationship between relative light intensities of red light, green light and blue light and thickness of optical adhesive film according to an embodiment of the present disclosure. According to FIG. 20, the dotted line indicates a change curve between the relative intensities of the green light and the thicknesses of the optical adhesive film 30; and the solid line indicates a change curve between the relative intensities of the red light or blue light and the thicknesses of the optical adhesive film 30. In the case that the thickness of the optical adhesive film 30 is greater than 200 microns, the relative light intensity of the red light, the relative light intensity of the green light, and the relative light intensity of the blue light are approximately the same. Thus, the thickness threshold in the above embodiment may be determined to be 200 microns.

For the above 104, in response to determining that the grayscale value of the second sub-image is not greater than the grayscale threshold, the grayscale value of the second region, which is in contact with the boundary of the first light control region, in the second light control region is adjusted, such that the adjusted grayscale value of the second region is greater than the grayscale value of the second region before adjustment. That is, in response to determining that the grayscale value of the second sub-image is not greater than the grayscale threshold, the grayscale value of the second region is increased. It should be noted that the grayscale value of the second region before adjustment is an initial grayscale value of the second light control region; and the adjusted grayscale value of the second region is greater than the initial grayscale value of the second light control region.

Figure 21:
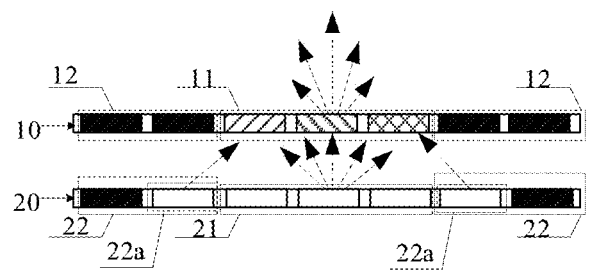
FIG. 21 is another schematic diagram of a light path in a display device according to an embodiment of the present disclosure.

Exemplarily, referring to FIG. 21, FIG. 21 is another schematic diagram of a light path in a display device according to an embodiment of the present disclosure. Assume that when the LCD panel 10 in the display device displays an image to be displayed, the boundary of the first sub-image 11 is overlapped with the boundary of the second sub-image 12 of the image to be displayed, the grayscale value of the first sub-image 11 is greater than the grayscale value of the second sub-image 12, and the grayscale value of the second sub-image 12 is not greater than the grayscale threshold. When the first light control region 21 and the second light control region 22 normally provide light to the LCD panel 10 and an angle between an observation direction of human eyes and a normal of the light-emitting surface of the LCD panel 10 is relatively large, wherein the first light control region 21 and the second light control region 22 are on the liquid crystal light control panel 20, the first light control region 21 corresponds to the first sub-image 11, and the second light control region 22 corresponds to the second sub-image 12, light emitted from the region of the first sub-image 11 will quickly attenuate, and then the attenuated light enters the human eyes, leading to a relatively low luminance of the observed first sub-image 11. After the grayscale value of the second region 22a is increased, when the angle between the observation direction of the human eyes and the normal of the light-emitting surface of the LCD panel 10 is relatively large, the attenuated light can be compensated by the second region 22a, wherein the second region 22a in the second light control region 22 is coincided with the boundary of the first light control region 21. In this way, the light intensity of the light entering the human eyes is relatively large, thus improving the luminance of the observed first sub-image 11.

In the present disclosure, in the case that the grayscale value of the second sub-image is not greater than the grayscale threshold, it is required to determine a maximum width of the second region in a direction perpendicular to the boundary of the first light control region, to maximally improve the luminance of the first sub-image. The maximum width of the second region in the direction perpendicular to the boundary of the first light control region is determined based on thicknesses and refractive indexes of all the first polarizer 10a, the LCD panel 10, the second polarizer 10b, the scattering film 40 and the optical adhesive film 30, and may be the same as the maximum width of the first region in the direction perpendicular to the boundary of the second light control region in the above embodiment. Exemplarily, the maximum width of the second region in the direction perpendicular to the boundary of the first light control region may be the width of four first pixels. In this case, in the case that the grayscale value of each first pixel in the second region is increased, the luminance of the image observed by the human eyes in the observation range within 45 degrees is relatively high.

In the embodiments of the present disclosure, there are various ways capable of increasing the grayscale value of the second region. The embodiments of the present disclosure take the following two possible implementations as examples for schematic illustration.

In a first possible implementation, the grayscale value of the second region may be increased to the grayscale value of the first light control region by the display device. In this case, in the case that the grayscale value of the second region is increased, the grayscale value of the second region is equal to the grayscale value of the first light control region.

In a second possible implementation, adjusting the grayscale value of the second region, which is in contact with the boundary of the first light control region, in the second light control region by the display device may include:

adjusting the grayscale value of the second region based on a grayscale value of a second fixed region in the second light control region other than the second region and the grayscale value of the first light control region, such that an adjusted grayscale value of the second region is greater than the grayscale value of the second fixed region and less than the grayscale value of the first light control region.

In the embodiment of the present disclosure, the grayscale value of the second region may be increased by the display device based on the grayscale value of the second fixed region and the grayscale value of the first light control region. In the case that the adjusted grayscale value of the second region is greater than the gray scale value of the second fixed region and less than the grayscale value of the first light control region, a probability of a sudden change in luminance between the first sub-image and the second sub-image may be reduced when the display device displays the image to be displayed.

Exemplarily, the second region includes at least two consecutive second sub-dimming regions. The second sub-dimming region includes at least one first pixel arranged along the boundary (that is, the boundary in contact with the second region in the first light control region) of the first light control region. In response to adjusting the grayscale value of the second region, grayscale values of the at least two second sub-dimming regions are sequentially increased along a direction from the second fixed region to the first light control region. In this way, the probability of the sudden change in the luminance between the first sub-image and the second sub-image may be further reduced when the display device displays the image to be displayed.

It should be noted that based on the above embodiment, the maximum number of the second sub-dimming regions in the second region is determined based on the width of the first pixel of the liquid crystal light control panel 20 and the thicknesses and the refractive indexes of all the first polarizer 10a, the LCD panel 10, the second polarizer 10b, the scattering film 40 and the optical adhesive film 30. Exemplarily, in the case that the maximum width of the second region in the direction perpendicular to the boundary of the first light control region is equal to the width of the four first pixels, the maximum number of the second sub-dimming regions in the second region is 4.

In the present disclosure, in response to adjusting the grayscale value of the second region, the grayscale values of the second fixed region, the at least two second sub-dimming regions and the first light control region are increased in an arithmetic sequence along the direction from the second fixed region to the first light control region. Therefore, evenly transition of the grayscale value of the second fixed region to the grayscale value of the first light control region may be achieved, such that the probability of the sudden change in the luminance between the first sub-image and the second sub-image may be minimized when the display device displays the image to be displayed, thus further improving the display quality of the display device.

Figure 22:
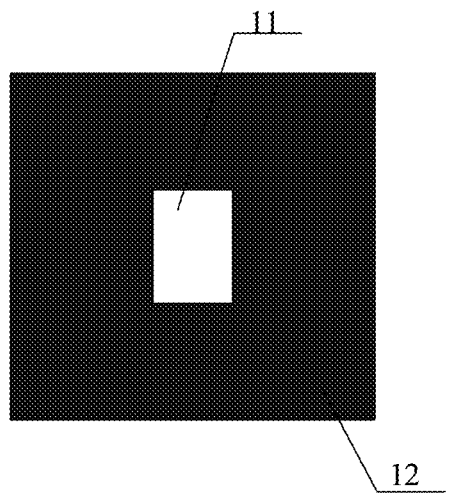
FIG. 22 is a schematic diagram of a first sub-image and a second sub-image according to an embodiment of the present disclosure.

Referring to FIG. 22, FIG. 22 is a schematic diagram of a first sub-image and a second sub-image according to an embodiment of the present disclosure. Assume that the first sub-image 11 is a rectangular image, and the second sub-image 12 is a rectangular ring-shaped image intersecting with an outer boundary of the first sub-image. Therefore, the first light control region of the liquid crystal light control panel is a rectangular region, the second light control region thereof is a rectangular ring-shaped region, and the second region in the second light control region intersecting with a boundary of the first light control region is also a rectangular ring-shaped region. A width of the second region is related to a number of rings of first pixels, in the second light control region, arranged around an outer boundary of the first light control region. The embodiments of the present disclosure take the following four cases as examples for illustration.

In a first case, in the case that a number of rings of first pixels, in the second light control region, arranged around the boundary of the first light control region is greater than or equal to 5, the second region includes four consecutive second sub-dimming regions.

Figure 23:
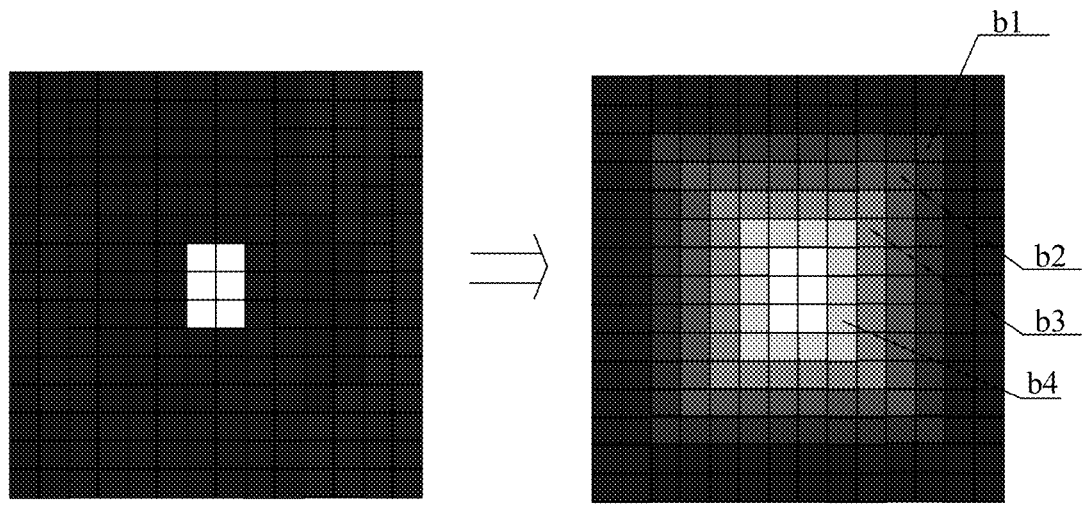
FIG. 23 is a schematic diagram of adjusting a grayscale of a second region according to an embodiment of the present disclosure.

Exemplarily, referring to FIG. 23, FIG. 23 is a schematic diagram of adjusting a grayscale of the second region according to an embodiment of the present disclosure. The second region may include four second sub-dimming regions: a second sub-dimming region b1, a second sub-dimming region b2, a second sub-dimming region b3 and a second sub-dimming region b4. Assume that prior to adjusting the grayscale value of the second region in the second light control region, the grayscale value of the second light control region is $L_B$. That is, after adjusting the grayscale value of the second region in the second light control region, the grayscale value of the second fixed region in the second light control region is $L_B$, and the grayscale value of the first light control region is $L_A$.

Then, in the case that the grayscale value of the second region in the second light control region is adjusted, grayscale values of the four consecutive second sub-dimming regions in the direction from the second fixed region to the first light control region are $L_B+(L_A-L_B)/5$, $L_B+2\times(L_A-L_B)/$ 5, $L_B+3\times(L_A-L_B)/5$, and $L_B+4\times(L_A-L_B)/5$ respectively. That is, a grayscale value of the second sub-dimming region b1 is $L_B+(L_A-L_B)/5$, a grayscale value of the second sub-dimming region b2 is $L_B+2\times(L_A-L_B)/5$, a grayscale value of the second sub-dimming region b3 is $L_B+3\times(L_A-L_B)/5$, and a grayscale value of the second sub-dimming region b4 is $L_B+4\times(L_A-L_B)/5$.

In a second case, in the case that the number of the rings of the first pixels, in the second light control region, arranged around the boundary of the first light control region is equal to 4, the second region includes three consecutive second sub-dimming regions. Assume that the grayscale value of the second fixed region is $L_B$, and the grayscale value of the first light control region is $L_A$.

Then, in the case that the grayscale value of the second region in the second light control region is adjusted, grayscale values of the three second sub-dimming regions in the direction from the second fixed region to the first light control region are $L_B+(L_A-L_B)/4$, $L_B+2\times(L_A-L_B)/4$, and $L_B+3\times(L_A-L_B)/4$ respectively.

In a third case, in the case that the number of the rings of the first pixels, in the second light control region, arranged around the boundary of the first light control region is equal to 3, the second region includes two consecutive second sub-dimming regions. Assume that the grayscale value of the second fixed region is $L_B$, and the grayscale value of the first light control region is $L_A$.

Then, in the case that the grayscale value of the second region in the second light control region is adjusted, grayscale values of the two consecutive second sub-dimming regions in the direction from the second fixed region to the first light control region are $L_B+(L_A-L_B)/3$ and $L_B+2\times(L_A-L_B)/3$ respectively.

In a fourth case, in the case that the number of the rings of the first pixels, in the second light control region, arranged around the boundary of the first light control region is equal to 2, the second region includes one ring of first pixels arranged around the boundary of the first light control region. Assume that the grayscale value of the second fixed region is $L_B$, and the grayscale value of the first light control region is $L_A$.

Then, in the case that the grayscale value of the second region in the second light control region is adjusted, the grayscale value of the second region is $L_B+(L_A-L_B)/2$.

It should be noted that the sequence of the steps of the display method provided by the embodiments of the present disclosure may be adjusted appropriately, and the steps may be deleted or added based on the situation. Within the technical scope disclosed in the present disclosure, any variations of the method easily derived by a person of ordinary skill in the art shall fall within the protection scope of the present disclosure, which is not repeated here.

In summary, in the display method according to the embodiments of the present disclosure, the boundary of the first sub-image is in contact with the boundary of the second sub-image, and the grayscale value of the second sub-image is less than the grayscale of the first sub-image. In response to determining that the grayscale value of the second sub-image is greater than the grayscale threshold, the grayscale value of the first region, which is in contact with the boundary of the second light control region, in the first light control region is decreased. In this way, after passing through the region of the second sub-image on the LCD panel, light intensity of light emitted from the first region with the relatively low grayscale value is low. Thus, the probability of the occurrence of ghost images is effectively reduced, improving the display quality of the display device.

Further, in response to determining that the grayscale value of the second sub-image is not greater than the grayscale threshold, the grayscale value of the second region, which is in contact with the boundary of the first light control region, in the second light control region is increased. In this way, the attenuated light can be compensated by the second region with the relatively high grayscale value, thus increasing a luminance of the first sub-image.

A display device is also provided according to an embodiment of the present disclosure. The display device may be any product or component having a display function, such as electronic paper, a mobile phone, a tablet, a television, a display, a laptop, a digital photo frame, a navigator or the like.

Figure 24:
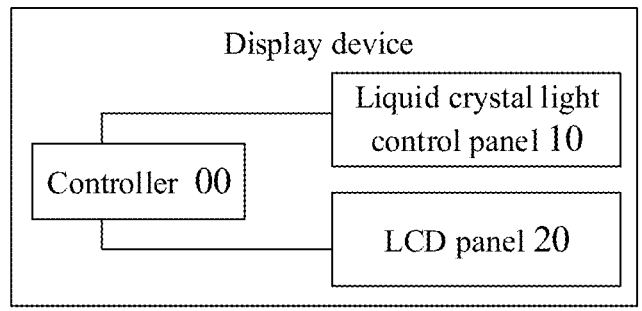
FIG. 24 is a block diagram of a display device according to an embodiment of the present disclosure.

The display device may include an LCD panel and a liquid crystal light control panel stacked together. A structure of the display device may be indicated by the corresponding content of FIG. 1. Referring to FIG. 24, FIG. 24 is a block diagram of a display device according to an embodiment of the present disclosure. The display device may further include:

a controller 00 electrically connected to the liquid crystal light control panel 10 and the LCD panel 20 respectively. The controller 00 is configured to:

acquire a first sub-image and a second sub-image of an image to be displayed on the LCD panel, a boundary of the first sub-image being in contact with a boundary of the second sub-image, a grayscale value of the first sub-image being greater than a grayscale value of the second sub-image;

determine whether the grayscale value of the second sub-image is greater than a grayscale threshold;

in response to determining that the grayscale value of the second sub-image is greater than the grayscale threshold, adjust a grayscale value of a first region, which is in contact with a boundary of a second light control region, in a first light control region, such that an adjusted grayscale value of the first region is less than a grayscale value of the first region before adjustment, wherein the first light control region is a region of the liquid crystal light control panel corresponding to the first sub-image, and the second light control region is a region of the liquid crystal light control panel corresponding to the second sub-image;

in response to determining that the grayscale value of the second sub-image is not greater than the grayscale threshold, adjust a grayscale value of a second region, which is in contact with a boundary of the first light control region, in the second light control region, such that an adjusted grayscale value of the second region is greater than a grayscale value of the second region before adjustment; and control the LCD panel to display the image to be displayed, and control the liquid crystal light control panel to display a light control image, wherein a grayscale of the light control image is adjusted.

Optionally, the controller 00 is configured to adjust the grayscale value of the first region based on a grayscale value of a first fixed region in the first light control region other than the first region and a grayscale value of the second light control region, such that the adjusted grayscale value of the first region is less than the grayscale value of the first fixed region and greater than the grayscale value of the second light control region.

Optionally, the first region includes at least two consecutive first sub-dimming regions; the first sub-dimming region includes at least one first pixel arranged along the boundary of the second light control region; and in response to adjusting the grayscale value of the first region, grayscale values of the at least two first sub-dimming regions are sequentially decreased along a direction from the first fixed region to the second light control region.

Optionally, in response to adjusting the grayscale value of the first region, grayscale values of the first fixed region, the at least two first sub-dimming regions and the second light control region are decreased in an arithmetic sequence along the direction from the first fixed region to the second light control region.

Optionally, the controller 00 is configured to adjust the grayscale value of the second region based on a grayscale value of a second fixed region in the second light control region other than the second region and a grayscale value of the first light control region, such that the adjusted grayscale value of the second region is greater than the grayscale value of the second fixed region and less than the grayscale value of the first light control region.

Optionally, the second region includes at least two consecutive second sub-dimming regions; the second sub-dimming region includes at least one first pixel arranged along the boundary of the first light control region; and in response to adjusting the grayscale value of the second region, grayscale values of the at least two second sub-dimming regions are sequentially increased along a direction from the second fixed region to the first light control region.

Optionally, the display device further includes a scattering film, an optical adhesive film, a first polarizer and a second polarizer, wherein the scattering film and the optical adhesive film are disposed between the liquid crystal light control panel and the LCD panel and the first polarizer and the second polarizer are disposed on two sides of the LCD panel respectively;

a maximum number of the first sub-dimming regions in the first region and a maximum number of the second sub-dimming regions in the second region are determined based on a width of the first pixel of the liquid crystal light control panel and thicknesses and refractive indexes of the first polarizer, the LCD panel, the second polarizer, the scattering film and the optical adhesive film.

Optionally, the thickness of the optical adhesive film is greater than a thickness threshold, wherein the thickness threshold is determined based on a center-to-center distance of two adjacent sub-pixels of the LCD panel.

Optionally, the first sub-image is a rectangular image; the second sub-image is a rectangular ring-shaped image intersecting with an outer boundary of the first sub-image; and a shape of the first light control region is a rectangle;

in the case that a number of first pixels, in the first light control region, arranged in a direction of a short side of the rectangle is greater than or equal to 9, the first region includes four consecutive first sub-dimming regions; and in the case that the grayscale value of the first region is adjusted, grayscale values of the four first sub-dimming regions in a direction from the first fixed region to the second light control region are $L_B+4\times(L_A-L_B)/5$, $L_B+3\times(L_A-L_B)/5$, $L_B+2\times(L_A-L_B)/5$, and $L_B+(L_A-L_B)/5$ respectively;

in the case that the number of the first pixels, in the first light control region, arranged in the direction of the short side of the rectangle is greater than or equal to 7 and less than 9, the first region includes three consecutive first sub-dimming regions; and in the case that the grayscale value of the first region is adjusted, grayscale values of the three first sub-dimming regions in the direction from the first fixed region to the second light control region are $L_B+3\times(L_A-L_B)/4$, $L_B+2\times(L_A-L_B)/4$, and $L_B+(L_A-L_B)/4$ respectively;

in the case that the number of the first pixels, in the first light control region, arranged in the direction of the short side of the rectangle is greater than or equal to 5 and less than 7, the first region includes two consecutive first sub-dimming regions; and in the case that the grayscale value of the first region is adjusted, grayscale values of the two first sub-dimming regions in the direction from the first fixed region to the second light control region are $L_B+2\times(L_A-L_B)/3$ and $L_B+(L_A-L_B)/3$ respectively;

in the case that the number of the first pixels, in the first light control region, arranged in the direction of the short side of the rectangle is greater than or equal to 3 and less than 5, the first region includes one ring of first pixels arranged along the boundary of the second light control region; and in the case that the grayscale value of the first region is adjusted, the grayscale value of the first region is $L_B+(L_A-L_B)/2$;

wherein the $L_A$ is the grayscale value of the first fixed region, and the $L_B$ is the grayscale value of the second light control region.

Optionally, the first sub-image is a rectangular image; the second sub-image is a rectangular ring-shaped image intersecting with an outer boundary of the first sub-image; a shape of the first light control region is a rectangle; and a first pixel of the liquid crystal light control panel includes three first sub-pixels;

in the case that a number of the first pixels, in the first light control region, arranged in the direction of the short side of the rectangle is equal to 2, and an arrangement direction of the three first sub-pixels of the first pixel is the same as the direction of the short side of the rectangle, the first region includes at least two rows of first sub-pixels arranged in a direction of a long side of the rectangle; and in the case that the grayscale value of the first region is adjusted, the grayscale value of the first region is $L_B+(L_A-L_B)/2$;

wherein the $L_A$ is the grayscale value of the first fixed region, and the $L_B$ is a grayscale value of the second light control region.

Optionally, the first sub-image is a rectangular image; the second sub-image is a rectangular ring-shaped image intersecting with an outer boundary of the first sub-image;

in the case that a number of rings of first pixels, in the second light control region, arranged around the boundary of the first light control region is greater than or equal to 5, the second region includes four consecutive second sub-dimming regions; and in the case that the grayscale value of the second region is increased, grayscale values of the four second sub-dimming regions in a direction from the second fixed region to the first light control region are $L_B+(L_A-L_B)/5$, $L_B+2\times(L_A-L_B)/5$, $L_B+3\times(L_A-L_B)/5$, and $L_B+4\times(L_A-L_B)/5$ respectively;

in the case that the number of the rings of the first pixels, in the second light control region, arranged around the boundary of the first light control region is equal to 4, the second region includes three consecutive second sub-dimming regions; and in the case that the grayscale value of the second region is increased, grayscale values of the three second sub-dimming regions in the direction from the second fixed region to the first light control region are $L_B+(L_A-L_B)/4$, $L_B+2\times(L_A-L_B)/4$, and $L_B+3\times(L_A-L_B)/4$ respectively;

in the case that the number of the rings of the first pixels, in the second light control region, arranged around the boundary of the first light control region is equal to 3, the second region includes two consecutive second sub-dimming regions; and in the case that the grayscale value of the second region is increased, grayscale values of the two second sub-dimming regions in the direction from the second fixed region to the first light control region are $L_B+(L_A-L_B)/3$ and $L_B+2\times(L_A-L_B)/3$ respectively;

in the case that the number of the rings of the first pixels, in the second light control region, arranged around the boundary of the first light control region is equal to 2, the second region includes one ring of first pixels arranged around the boundary of the first light control region; and in the case that the grayscale value of the second region is increased, the grayscale value of the second region is $L_B+(L_A-L_B)/2$;

wherein the $L_A$ is the grayscale value of the first light control region, and the $L_B$ is the grayscale value of the second fixed region.

Figure 25:
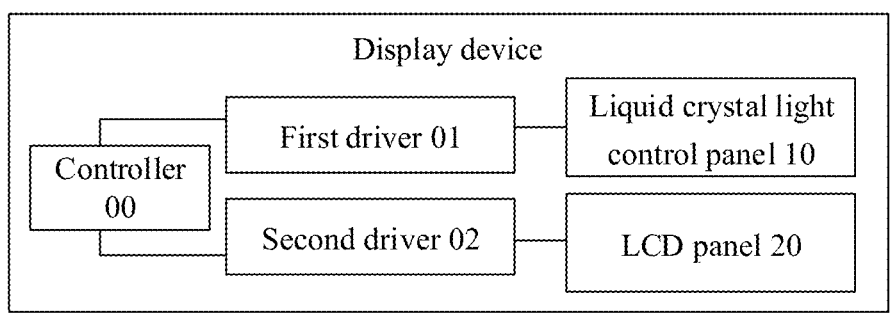
FIG. 25 is a block diagram of another display device according to an embodiment of the present disclosure.

Optionally, referring to FIG. 25, FIG. 25 is a block diagram of another display device according to an embodiment of the present disclosure. The display device may further include: a first driver 01 and a second driver 02, wherein the first driver 01 is connected to the liquid crystal light control panel 10 and the controller 00, the second driver 02 is connected to the LCD panel 20 and the controller 00. The controller 00 is configured to control the LCD panel to display the image to be displayed through the first driver 01 and control the liquid crystal light control panel 20 to display a light control image through the second driver 02, wherein a grayscale of the light control image is adjusted.

In embodiments of the present disclosure, the controller 00 may include a processor such as a field programmable gate array (FPGA), a central processing unit (CPU) or the like. Each of the first driver 01 and the second driver 02 may include a timing controller (TCON), a source driver and a gate driver.

Those skilled in the art may clearly understand that for the sake of convenience and briefness of illustration, the working principle of the above-mentioned display device may refer to the corresponding portion of the embodiments of the display method, which is not repeated here.

In summary, in the display device according to the embodiments of the present disclosure, the boundary of the first sub-image is in contact with the boundary of the second sub-image, and the grayscale value of the second sub-image is less than the grayscale of the first sub-image. In response to determining that the grayscale value of the second sub-image is greater than the grayscale threshold, the grayscale value of the first region, which is in contact with the boundary of the second light control region, in the first light control region is decreased. In this way, after passing through the region of the second sub-image on the LCD panel, light intensity of light emitted from the first region with the relatively low grayscale value is low. Thus, a probability of the occurrence of ghost images is effectively reduced, improving the display quality of the display device. Further, in response to determining that the grayscale value of the second sub-image is not greater than the grayscale threshold, the grayscale value of the second region, which is in contact with the boundary of a first light control region, in a second light control region is increased. In this way, the attenuated light can be compensated by the second region with the relatively high grayscale value, thus increasing a luminance of the first sub-image.

A non-transitory computer-readable storage medium is also provided according to an embodiment of the present disclosure. The non-transitory computer-readable storage medium stores an instruction thereon, wherein when the instruction runs on a processing component, the processing component is caused to perform the display method shown in FIG. 9 or FIG. 10.

It should be pointed out that in the accompanying drawings, the dimensions of layers and regions may be exaggerated for the clarity of illustration. Moreover, it can be understood that when an element or a layer is referred to as "on" another element or layer, the element or layer may be directly disposed on the another element, or there may be an intermediate layer. In addition, it can be understood that when an element or a layer is referred to as "under" another element or layer, the element or layer may be directly disposed under the another element, or there may be more than one intermediate layer or element. In addition, understandably, when an element or a layer is referred to as "between" two layers or two elements, the element or layer may be the only one layer between the two layers or the two elements, or there may be more than one intermediate layer or element. Similar reference numerals indicate similar elements throughout the text.

The terms "first" and "second" used in the present disclosure are merely configured to describe but not denote or imply any relative importance. The term "a plurality of" means two or more, unless otherwise expressly provided.

Those skilled in the art may understand that all or part of the steps of the above embodiments may be performed by hardware, or by a program to instruct related hardware. The program may be stored in a computer-readable storage medium which may be a read-only memory, a magnetic disk, an optical disk or the like.

Above-mentioned embodiments are merely exemplary embodiments of the present disclosure, and are not intended to limit the present disclosure. Any modifications, equivalent replacements, improvements, and the like made within the spirit and principles of the present disclosure should be within the scope of protection of the present disclosure.

What is claimed is:

1. A display method applicable to a display device, the display device comprising a liquid crystal light control panel and a liquid crystal display (LCD) panel stacked together, the method comprising:

acquiring a first sub-image and a second sub-image of an image to be displayed on the LCD panel, a boundary of the first sub-image being in contact with a boundary of the second sub-image, a grayscale value of the first sub-image being greater than a grayscale value of the second sub-image;

determining whether the grayscale value of the second sub-image is greater than a grayscale threshold;

in response to determining that the grayscale value of the second sub-image is greater than the grayscale threshold, adjusting a grayscale value of a first region, which is in contact with a boundary of a second light control region, in a first light control region, such that an adjusted grayscale value of the first region is less than a grayscale value of the first region before adjustment, wherein the first light control region is a region of the liquid crystal light control panel corresponding to the first sub-image, and the second light control region is a region of the liquid crystal light control panel corresponding to the second sub-image;

in response to determining that the grayscale value of the second sub-image is not greater than the grayscale threshold, adjusting a grayscale value of a second region, which is in contact with a boundary of the first light control region, in the second light control region, such that an adjusted grayscale value of the second region is greater than a grayscale value of the second region before adjustment; and controlling the LCD panel to display the image to be displayed, and controlling the liquid crystal light control panel to display a light control image, wherein a grayscale of the light control image is adjusted.

2. The method according to claim 1, wherein adjusting the grayscale value of the first region in the first light control region comprises:

adjusting the grayscale value of the first region based on a grayscale value of a first fixed region in the first light control region other than the first region and a grayscale value of the second light control region, such that the adjusted grayscale value of the first region is less than the grayscale value of the first fixed region and greater than the grayscale value of the second light control region.

3. The method according to claim 2, wherein the first region comprises at least two consecutive first sub-dimming regions; each of the at least two consecutive first sub-dimming regions comprises at least one first pixel arranged along the boundary of the second light control region; and in response to adjusting the grayscale value of the first region, grayscale values of the at least two consecutive first sub-dimming regions are sequentially decreased along a direction from the first fixed region to the second light control region.

4. The method according to claim 1, wherein adjusting the grayscale value of the second region in the second light control region comprises:

adjusting the grayscale value of the second region based on a grayscale value of a second fixed region in the second light control region other than the second region and a grayscale value of the first light control region, such that the adjusted grayscale value of the second region is greater than the grayscale value of the second fixed region and less than the grayscale value of the first light control region.

5. The method according to claim 4, wherein the second region comprises at least two consecutive second sub-dimming regions; each of the at least two consecutive second sub-dimming regions comprises at least one first pixel arranged along the boundary of the first light control region; and in response to adjusting the grayscale value of the second region, grayscale values of the at least two consecutive second sub-dimming regions are sequentially increased along a direction from the second fixed region to the first light control region.

6. The method according to claim 1, wherein the display device further comprises a scattering film, an optical adhesive film, a first polarizer and a second polarizer, wherein the scattering film and the optical adhesive film are disposed between the liquid crystal light control panel and the LCD panel, and the first polarizer and the second polarizer are disposed on two sides of the LCD panel respectively;

a maximum number of first sub-dimming regions in the first region and a maximum number of second sub-dimming regions in the second region are determined based on a width of a first pixel of the liquid crystal light control panel and thicknesses and refractive indexes of the first polarizer, the LCD panel, the second polarizer, the scattering film and the optical adhesive film.

7. The method according to claim 6, wherein the thickness of the optical adhesive film is greater than a thickness threshold, wherein the thickness threshold is determined based on a center-to-center distance of two adjacent sub-pixels of the LCD panel.

8. The method according to claim 7, wherein the first sub-image is a rectangular image; the second sub-image is a rectangular ring-shaped image intersecting with an outer boundary of the first sub-image; a shape of the first light control region is a rectangle; and the first pixel of the liquid crystal light control panel comprises three first sub-pixels; and in the case that a number of first pixels, in the first light control region, arranged in a direction of a short side of the rectangle is equal to 2, and an arrangement direction of the three first sub-pixels of the first pixel is the same as the direction of the short side of the rectangle, the first region comprises at least two rows of first sub-pixels arranged in a direction of a long side of the rectangle; and in the case that the grayscale value of the first region is adjusted, the grayscale value of the first region is $L_B+(L_A-L_B)/2$;

wherein the $L_A$ is a grayscale value of the first fixed region, and the $L_B$ is a grayscale value of the second light control region.

9. The method according to claim 6, wherein the first sub-image is a rectangular image; the second sub-image is a rectangular ring-shaped image intersecting with an outer boundary of the first sub-image; and a shape of the first light control region is a rectangle;

in the case that a number of first pixels, in the first light control region, arranged in a direction of a short side of the rectangle is greater than or equal to 9, the first region comprises four consecutive first sub-dimming regions; and in the case that the grayscale value of the first region is adjusted, grayscale values of the four first sub-dimming regions in a direction from a first fixed region to the second light control region are $L_B+4\times(L_A-L_B)/5$, $L_B+3\times(L_A-L_B)/5$, $L_B+2\times(L_A-L_B)/5$, and $L\beta+(L\Delta-L_B)/5$ respectively;

in the case that the number of the first pixels, in the first light control region, arranged in the direction of the short side of the rectangle is greater than or equal to 7 and less than 9, the first region comprises three consecutive first sub-dimming regions; and in the case that the grayscale value of the first region is adjusted, grayscale values of the three first sub-dimming regions in the direction from the first fixed region to the second light control region are $L_B+3\times(L_A-L_B)/4$, $L_B+2\times(L_A-L_B)/4$, and $L_B+(L_A-L_B)/4$ respectively;

in the case that the number of the first pixels, in the first light control region, arranged in the direction of the short side of the rectangle is greater than or equal to 5 and less than 7, the first region comprises two consecutive first sub-dimming regions; and in the case that the grayscale value of the first region is adjusted, grayscale values of at least two consecutive first sub-dimming regions in the direction from the first fixed region to the second light control region are $L_B+2\times(L_A-L_B)/3$ and $L_B+(L_A-L_B)/3$ respectively; and in the case that the number of the first pixels, in the first light control region, arranged in the direction of the short side of the rectangle is greater than or equal to 3 and less than 5, the first region comprises one ring of first pixels arranged along the boundary of the second light control region; and in the case that the grayscale value of the first region is adjusted, the grayscale value of the first region is $L_B+(L_A-L_B)/2$;

wherein the $L_A$ is a grayscale value of the first fixed region, and the $L_B$ is a grayscale value of the second light control region.

10. The method according to claim 6, wherein the first sub-image is a rectangular image; the second sub-image is a rectangular ring-shaped image intersecting with an outer boundary of the first sub-image;
in the case that a number of rings of first pixels, in the second light control region, arranged around the boundary of the first light control region is greater than or equal to 5, the second region comprises four consecutive second sub-dimming regions; and in the case that the grayscale value of the second region is increased, grayscale values of the four second sub-dimming regions in a direction from a second fixed region to the first light control region are $L_B+(L_A-L_B)/5$, $L_B+2\times(L_A-L_B)/5$, $L_B+3\times(L_A-L_B)/5$, and $L_B+4\times(L_A-L_B)/5$ respectively;
in the case that the number of the rings of the first pixels, in the second light control region, arranged around the boundary of the first light control region is equal to 4, the second region comprises three consecutive second sub-dimming regions; and in the case that the grayscale value of the second region is increased, grayscale values of the three second sub-dimming regions in the direction from the second fixed region to the first light control region are $L_B+(L_A-L_B)/4$, $L_B+2\times(L_A-L_B)/4$, and $L_B+3\times(L_A-L_B)/4$ respectively;
in the case that the number of the rings of the first pixels, in the second light control region, arranged around the boundary of the first light control region is equal to 3, the second region comprises two consecutive second sub-dimming regions; and in the case that the grayscale value of the second region is increased, grayscale values of the at least two consecutive second sub-dimming regions in the direction from the second fixed region to the first light control region are $L_B+(L_A-L_B)/3$ and $L_B+2\times(L_A-L_B)/3$ respectively; and
in the case that the number of the rings of the first pixels, in the second light control region, arranged around the boundary of the first light control region is equal to 2, the second region comprises one ring of first pixels arranged around the boundary of the first light control region; and in the case that the grayscale value of the second region is increased, the grayscale value of the second region is $L_B+(L_A-L_B)/2$;
wherein the $L_A$ is a grayscale value of the first light control region, and the $L_B$ is a grayscale value of the second fixed region.

11. A display device comprising a liquid crystal light control panel and a liquid crystal display (LCD) panel stacked together, and further comprising:
a controller electrically connected to the liquid crystal light control panel and the LCD panel respectively, wherein the controller is configured to:
acquire a first sub-image and a second sub-image of an image to be displayed on the LCD panel, a boundary of the first sub-image being in contact with a boundary of the second sub-image, a grayscale value of the first sub-image being greater than a grayscale value of the second sub-image;
determine whether the grayscale value of the second sub-image is greater than a grayscale threshold;
in response to determining that the grayscale value of the second sub-image is greater than the grayscale threshold, adjust a grayscale value of a first region, which is in contact with a boundary of a second light control region, in a first light control region, such that an adjusted grayscale value of the first region is less than a grayscale value of the first region before adjustment, wherein the first light control region is a region of the liquid crystal light control panel corresponding to the first sub-image, and the second light control region is a region of the liquid crystal light control panel corresponding to the second sub-image;
in response to determining that the grayscale value of the second sub-image is not greater than the grayscale threshold, adjust a grayscale value of a second region, which is in contact with a boundary of the first light control region, in the second light control region, such that an adjusted grayscale value of the second region is greater than a grayscale value of the second region before adjustment; and
control the LCD panel to display the image to be displayed, and control the liquid crystal light control panel to display a light control image, wherein a grayscale of the light control image is adjusted.

12. The display device according to claim 11, wherein the controller is configured to adjust the grayscale value of the first region based on a grayscale value of a first fixed region in the first light control region other than the first region and a grayscale value of the second light control region, such that the adjusted grayscale value of the first region is less than the grayscale value of the first fixed region and greater than the grayscale value of the second light control region.

13. The display device according to claim 12, wherein the first region comprises at least two consecutive first sub-dimming regions; each of the at least two consecutive first sub-dimming regions comprises at least one first pixel arranged along the boundary of the second light control region; and in response to adjusting the grayscale value of the first region, grayscale values of the at least two consecutive first sub-dimming regions are sequentially decreased along a direction from the first fixed region to the second light control region.

14. The display device according to claim 11, wherein the controller is configured to adjust the grayscale value of the second region based on a grayscale value of a second fixed region in the second light control region other than the second region and a grayscale value of the first light control region, such that the adjusted grayscale value of the second region is greater than the grayscale value of the second fixed region and less than the grayscale value of the first light control region.

15. The display device according to claim 14, wherein the second region comprises at least two consecutive second sub-dimming regions; each of the at least two consecutive second sub-dimming region comprises at least one first pixel arranged along the boundary of the first light control region; and in response to adjusting the grayscale value of the second region, grayscale values of the at least two consecutive second sub-dimming regions are sequentially increased along a direction from the second fixed region to the first light control region.

16. The display device according to claim 11, wherein the display device further comprises a scattering film, an optical adhesive film, a first polarizer and a second polarizer, wherein the scattering film and the optical adhesive film are disposed between the liquid crystal light control panel and the LCD panel, and the first polarizer and the second polarizer are disposed on two sides of the LCD panel respectively;
a maximum number of first sub-dimming regions in the first region and a maximum number of second sub-dimming regions in the second region are determined based on a width of a first pixel of the liquid crystal light control panel and thicknesses and refractive indexes of the first polarizer, the LCD panel, the second polarizer, the scattering film and the optical adhesive film.

17. The display device according to claim 16, wherein the thickness of the optical adhesive film is greater than a thickness threshold, wherein the thickness threshold is determined based on a center-to-center distance of two adjacent sub-pixels of the LCD panel.

18. The display device according to claim 17, wherein the first sub-image is a rectangular image; the second sub-image is a rectangular ring-shaped image intersecting with an outer boundary of the first sub-image; a shape of the first light control region is a rectangle; and the first pixel of the liquid crystal light control panel comprises three first sub-pixels; and in the case that a number of first pixels, in the first light control region, arranged in a direction of a short side of the rectangle is equal to 2, and an arrangement direction of the three first sub-pixels of the first pixel is the same as the direction of the short side of the rectangle, the first region comprises at least two rows of first sub-pixels arranged in a direction of a long side of the rectangle; and in the case that the grayscale value of the first region is adjusted, the grayscale value of the first region is $L_B+(L_A-L_B)/2$;

wherein the $L_A$ is a grayscale value of the first fixed region, and the $L_B$ is a grayscale value of the second light control region.

19. A non-transitory computer-readable storage medium storing an instruction thereon, wherein when the instruction runs on a processing component, the processing component is caused to:

acquire a first sub-image and a second sub-image of an image to be displayed on the LCD panel, a boundary of the first sub-image being in contact with a boundary of the second sub-image, a grayscale value of the first sub-image being greater than a grayscale value of the second sub-image;

determine whether the grayscale value of the second sub-image is greater than a grayscale threshold;

in response to determining that the grayscale value of the second sub-image is greater than the grayscale threshold, adjust a grayscale value of a first region, which is in contact with a boundary of a second light control region, in a first light control region, such that an adjusted grayscale value of the first region is less than a grayscale value of the first region before adjustment, wherein the first light control region is a region of the liquid crystal light control panel corresponding to the first sub-image, and the second light control region is a region of the liquid crystal light control panel corresponding to the second sub-image;

in response to determining that the grayscale value of the second sub-image is not greater than the grayscale threshold, adjust a grayscale value of a second region, which is in contact with a boundary of the first light control region, in the second light control region, such that an adjusted grayscale value of the second region is greater than a grayscale value of the second region before adjustment; and control the LCD panel to display the image to be displayed, and control the liquid crystal light control panel to display a light control image, wherein a grayscale of the light control image is adjusted.

20. The display device according to claim 11, further comprising a first driver and a second driver, wherein the first driver is connected to the liquid crystal light control panel and the controller, the second driver is connected to the LCD panel and the controller; and the controller is configured to control the LCD panel to display the image to be displayed through the first driver and control the liquid crystal light control panel to display a light control image through the second driver, wherein a grayscale of the light control image is adjusted.

* * * * *